(12) United States Patent
McRoberts et al.

(10) Patent No.: US 9,751,176 B2
(45) Date of Patent: Sep. 5, 2017

(54) POWER TOOL ACCESSORY ATTACHMENT SYSTEM

(71) Applicant: Black & Decker Inc., Newark, DE (US)

(72) Inventors: Jason McRoberts, Windsor, PA (US); Ashok S. Baskar, Lutherville, MD (US); Nicholas A. Mondich, Newark, DE (US); Anthony Reth, Newark, DE (US)

(73) Assignee: BLACK & DECKER INC., New Britain, CT (US)

( * ) Notice: Subject to any disclaimer, the term of this patent is extended or adjusted under 35 U.S.C. 154(b) by 413 days.

(21) Appl. No.: 14/465,348

(22) Filed: Aug. 21, 2014

(65) Prior Publication Data

US 2015/0343583 A1    Dec. 3, 2015

Related U.S. Application Data

(60) Provisional application No. 62/005,194, filed on May 30, 2014, provisional application No. 62/028,839, filed on Jul. 25, 2014.

(51) Int. Cl.
*B25B 13/46* (2006.01)
*B23Q 5/04* (2006.01)
(Continued)

(52) U.S. Cl.
CPC ............ *B23Q 5/045* (2013.01); *B25F 3/00* (2013.01); *B25F 5/02* (2013.01); *Y10T 29/49828* (2015.01); *Y10T 279/3406* (2015.01)

(58) Field of Classification Search
CPC ... B25F 3/00; B25F 5/02; B23Q 5/045; B23Q 5/046; B25B 23/0021; B25D 16/006
(Continued)

(56) References Cited

U.S. PATENT DOCUMENTS

| 2,848,584 A | 8/1958 | Goudy et al. |
| 3,301,971 A | 1/1967 | Johnson |

(Continued)

FOREIGN PATENT DOCUMENTS

| EP | 0931629 A2 | 7/1999 |
| EP | 1132179 | 9/2001 |

(Continued)

OTHER PUBLICATIONS

Tools Of The Trade (2014). Milwaukee M12 4-in-1 Drill Driver Kit. http://www.toolsofthetrade.net/cordless-tools/milwaukee-m12-4-in-1-drill-driver-kit_o.aspx?dfpzone=blogs.davidfrane&utm_source=newsletter&utm_content=jump&utm_medium=email&utm_campaign=TOTTU_080514&day=2014-08-05. Posted Jul. 28, 2014.

(Continued)

*Primary Examiner* — Robert Long
(74) *Attorney, Agent, or Firm* — Stephen R. Valancius

(57) ABSTRACT

A power tool is provided and may include a motor, an output shaft, a neck portion, and a collar portion. The output shaft may be driven by the motor. The neck portion may be configured to receive a removable attachment accessory. The neck portion may define a first diameter and may include a plurality of indexing features. The collar portion may be supported by the neck portion. The collar portion may include an outer circumferential surface defining a second diameter that is greater than the first diameter. The outer circumferential surface may include at least one recess.

12 Claims, 15 Drawing Sheets

(51) Int. Cl.
*B25F 3/00* (2006.01)
*B25F 5/02* (2006.01)

(58) Field of Classification Search
USPC .......................................... 173/29, 46, 213
See application file for complete search history.

(56) References Cited

U.S. PATENT DOCUMENTS

| | | | |
|---|---|---|---|
| 3,698,747 A | | 10/1972 | Wing et al. |
| 3,884,587 A | | 5/1975 | Caldwell |
| 4,038,508 A | | 7/1977 | Mapelsden |
| 4,182,939 A | | 1/1980 | Feaster |
| 4,495,387 A | | 1/1985 | Thrush |
| 4,541,160 A | * | 9/1985 | Roberts .................. F16C 1/02 29/401.1 |
| 4,871,629 A | | 10/1989 | Bunyea |
| 4,962,681 A | * | 10/1990 | Yang ..................... B25B 21/00 408/20 |
| 5,033,552 A | * | 7/1991 | Hu ......................... B25B 21/00 173/170 |
| 5,224,230 A | | 7/1993 | Vanicsek et al. |
| 5,669,489 A | | 9/1997 | von Ende |
| 6,170,579 B1 | * | 1/2001 | Wadge .................... B25F 3/00 173/170 |
| 6,176,322 B1 | * | 1/2001 | Wadge .................... B25F 3/00 173/170 |
| 6,206,107 B1 | | 3/2001 | Wadge |
| 6,286,611 B1 | | 9/2001 | Bone |
| 6,463,824 B1 | | 10/2002 | Prell et al. |
| 6,550,786 B2 | | 4/2003 | Gifford et al. |
| 6,553,642 B2 | | 4/2003 | Driessen |
| 6,634,439 B2 | * | 10/2003 | Driessen ................. B25F 3/00 173/170 |
| 6,675,911 B2 | | 1/2004 | Driessen |
| 6,835,030 B2 | | 12/2004 | Pozgay et al. |
| 7,021,399 B2 | | 4/2006 | Driessen |
| 7,025,149 B2 | | 4/2006 | Pusateri et al. |
| 7,083,003 B1 | | 8/2006 | Pusateri et al. |
| 7,641,000 B2 | * | 1/2010 | Albert .................... E21B 3/025 175/61 |
| 7,736,216 B2 | * | 6/2010 | King ...................... B24B 23/04 451/357 |
| 7,743,683 B2 | * | 6/2010 | Dayton .................... B25F 3/00 173/216 |
| 7,793,572 B2 | | 9/2010 | Hirt et al. |
| 7,922,063 B2 | * | 4/2011 | Zemlok ............. A61B 17/07207 227/175.1 |
| 7,950,699 B2 | | 5/2011 | Bauer et al. |
| 7,985,068 B2 | | 7/2011 | Burdsall et al. |
| 8,157,296 B2 | | 4/2012 | Ullrich et al. |
| 8,172,642 B2 | | 5/2012 | King et al. |
| 8,360,439 B2 | | 1/2013 | Hirt et al. |
| 8,365,419 B2 | | 2/2013 | Bernardi et al. |
| 8,398,457 B2 | | 3/2013 | King et al. |
| 8,613,644 B2 | | 12/2013 | King et al. |
| 8,628,467 B2 | * | 1/2014 | Whitman ............ A61B 10/0233 600/129 |
| 9,402,604 B2 | * | 8/2016 | Williams ......... A61B 17/07207 |
| 2002/0050366 A1 | * | 5/2002 | Driessen .................. B25F 3/00 173/216 |
| 2002/0050368 A1 | * | 5/2002 | Driessen .................. B25F 3/00 173/217 |
| 2004/0139822 A1 | | 7/2004 | Gehring et al. |
| 2005/0048884 A1 | | 3/2005 | Baker |
| 2005/0100867 A1 | * | 5/2005 | Hilscher .............. A46B 5/0095 433/216 |
| 2007/0000138 A1 | * | 1/2007 | Baskar ................. A01G 3/0417 30/392 |
| 2007/0272060 A1 | * | 11/2007 | Schoenbeck ........... B25G 1/066 81/177.8 |
| 2009/0054208 A1 | * | 2/2009 | Wu ..................... A63B 22/0235 482/4 |
| 2009/0182354 A1 | * | 7/2009 | Blier ................. A61B 17/07207 606/148 |
| 2010/0032179 A1 | * | 2/2010 | Hanspers .................. B25F 5/00 173/11 |
| 2011/0110734 A1 | | 5/2011 | Scrimshaw et al. |
| 2011/0127731 A1 | | 6/2011 | Woecht et al. |
| 2011/0174099 A1 | * | 7/2011 | Ross .................... A61B 17/072 74/89.32 |
| 2011/0186316 A1 | * | 8/2011 | Barhitte .................. B25F 5/00 173/29 |
| 2011/0198102 A1 | | 8/2011 | Gairing |
| 2012/0031636 A1 | * | 2/2012 | King ....................... B25B 23/00 173/20 |
| 2012/0089131 A1 | * | 4/2012 | Zemlok ............ A61B 17/07207 606/1 |
| 2012/0090863 A1 | * | 4/2012 | Puzio ...................... B25B 21/02 173/2 |
| 2012/0116388 A1 | * | 5/2012 | Houser ............ A61B 17/00234 606/41 |
| 2013/0008677 A1 | | 1/2013 | Huifu |
| 2013/0020103 A1 | * | 1/2013 | McClaskey ............... B25F 3/00 173/29 |
| 2013/0020106 A1 | * | 1/2013 | Kuehne ..................... B25F 5/02 173/214 |
| 2013/0098966 A1 | * | 4/2013 | Kostrzewski .... A61B 17/07207 227/176.1 |
| 2013/0118767 A1 | * | 5/2013 | Cannaliato ............... B25F 3/00 173/29 |
| 2013/0228355 A1 | * | 9/2013 | Kuehne ..................... B25F 5/02 173/29 |
| 2013/0324979 A1 | * | 12/2013 | Nicholas .............. A61B 17/068 606/1 |
| 2013/0334281 A1 | * | 12/2013 | Williams ............. A61B 17/068 227/176.1 |
| 2014/0025046 A1 | * | 1/2014 | Williams .......... A61B 17/07207 606/1 |
| 2014/0332243 A1 | * | 11/2014 | Baskar .................... B25F 5/02 173/29 |
| 2014/0373652 A1 | * | 12/2014 | Zergiebel ................ F16H 19/02 74/89.23 |
| 2015/0053749 A1 | * | 2/2015 | Shelton, IV ......... A61B 17/068 227/181.1 |
| 2015/0216525 A1 | * | 8/2015 | Collins ................... H05K 7/06 227/176.1 |
| 2016/0242779 A1 | * | 8/2016 | Aranyi ............ A61B 17/07207 |

FOREIGN PATENT DOCUMENTS

| | | |
|---|---|---|
| EP | 1454710 | 9/2004 |
| EP | 2338644 | 6/2011 |
| EP | 2639015 | 9/2013 |

OTHER PUBLICATIONS

Fein U.S. (2014). ASCM 18 QX 4-speed cordless drill/driver. http://www.feinus.com/en_us/fastening/cordless-drill-drivers/ascm-18-qx-0307699/.
Fein U.S. (2014). Instruction Manual. http://media.fein.de/manuals/34101193060__ASCM__14__18__201304.pdf. pp. 1-13 and 18-21, Apr. 26, 2013.
EP Search Report dated Aug. 24, 2015.

* cited by examiner

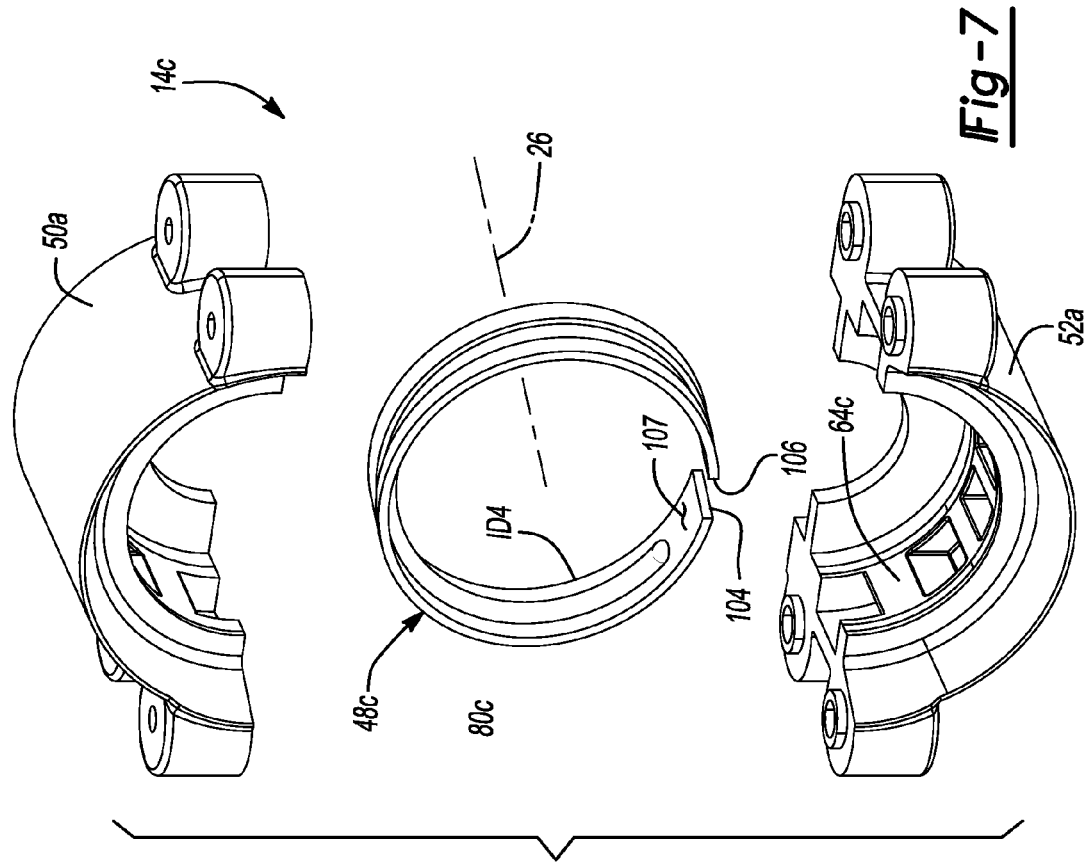
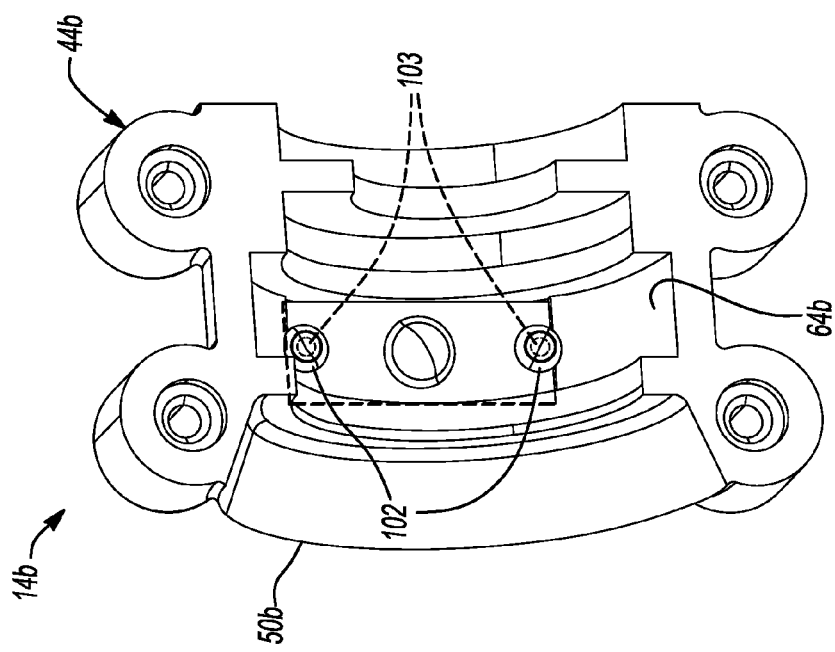

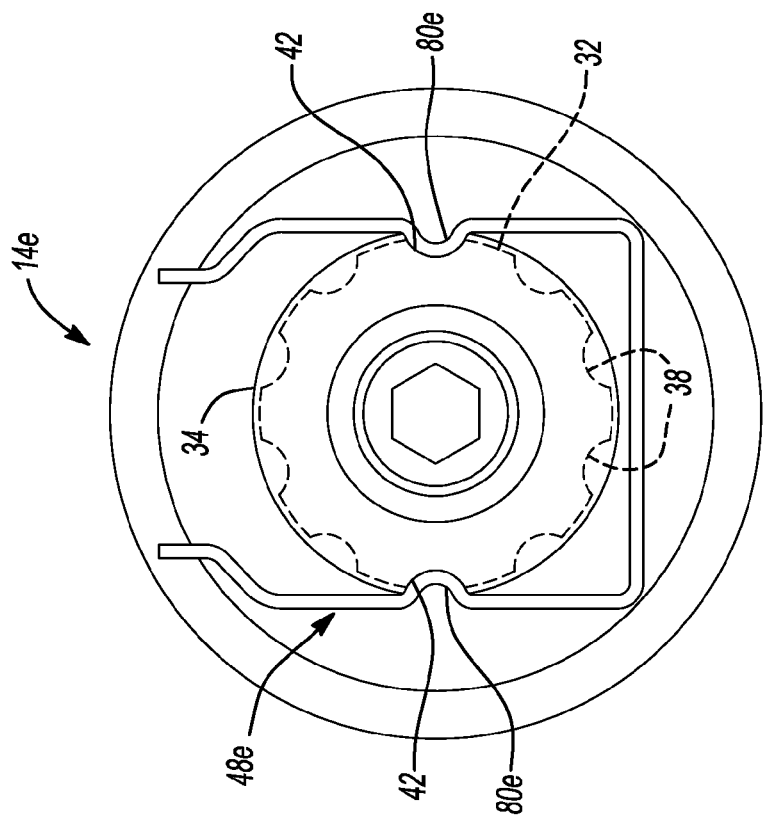
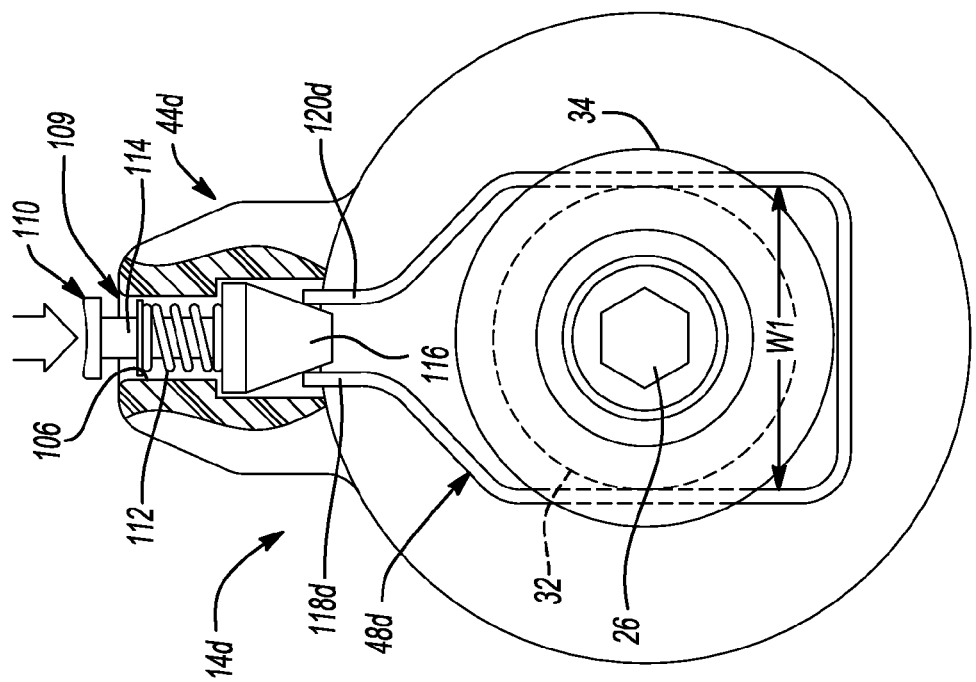

POWER TOOL ACCESSORY ATTACHMENT SYSTEM

CROSS-REFERENCE TO RELATED APPLICATIONS

This application claims the benefit of U.S. Provisional Application No. 62/005,194, filed on May 30, 2014, and U.S. Provisional Application No. 62/028,839, filed on Jul. 25, 2014. The entire disclosures of each of the above applications are incorporated herein by reference.

FIELD

The present disclosure relates to a power tool accessory attachment system, and more particularly to a system suitable for use in securing an accessory head to a power tool such as a drill or driver.

BACKGROUND

This section provides background information related to the present disclosure and is not necessarily prior art.

Various types of power tools are designed for use with various interchangeable accessories or accessory heads. For example, electrically powered multi tools can commonly be used to operate a sanding accessory head, a cutting accessory head, and a drilling/driving accessory head. The accessory heads can be attached to the multi tool body. When working with a power tool and an accessory head, it may be desirable to provide an accessory attachment system that allows a user to easily attach and/or remove the accessory head from the power tool, while also allowing the user to index, or otherwise rotate the accessory relative to the power tool.

SUMMARY

This section provides a general summary of the disclosure, and is not a comprehensive disclosure of its full scope or all of its features.

According to one particular aspect, the present disclosure provides a power tool. The power tool may include a motor, an output shaft, a neck portion, and a collar portion. The output shaft may be driven by the motor. The neck portion may be configured to receive a removable attachment accessory. The neck portion may define a first diameter and may include a plurality of indexing features. The collar portion may be supported by the neck portion. The collar portion may include an outer circumferential surface defining a second diameter that is greater than the first diameter. The outer circumferential surface may include at least one recess.

In some configurations, the at least one recess is aligned with one of the plurality of indexing features.

In some configurations, the collar has at least two recesses.

In some configurations, the at least two recesses are disposed on opposite sides of the collar.

In some configurations, the plurality of indexing features comprises a plurality of recesses separated by peripheral surface portions.

In some configurations, the power tool includes a removable attachment accessory. The removable attachment accessory includes a retainer having a radially inwardly extending key feature and the plurality of indexing features are configured to selectively engage the key feature.

In some configurations, the recess is configured to allow the key feature to be moved past the collar.

In some configurations, the power tool is a drill or a screwdriver.

In some configurations, the retainer is a biasing member.

In some configurations, the biasing member is a leaf spring.

In some configurations, the biasing member is substantially U-shaped.

In some configurations, the key feature includes a substantially U-shaped lobe.

In some configurations, the key feature includes a substantially hemispherical detent.

In some configurations, the accessory includes a housing having first and second clamshells. The first clamshell includes first and second pockets. The second clamshell includes third and fourth pockets that are aligned with the first and second pockets, respectively. The retainer includes a first member at least partially disposed in the first and second pockets, and a second member at least partially disposed in the third and fourth pockets.

In some configurations, the first and second members are leaf springs.

In some configurations, the accessory includes a hub and a collar slidably supported by the hub.

In some configurations, the collar includes a radially inwardly extending lock portion operable to lock the retainer in a first position.

In some configurations, the retainer includes a substantially spherical member.

In some configurations, the retainer is monolithically formed with the collar.

In some configurations, the retainer is resiliently flexible.

In some configurations, the hub includes an axially extending channel and a circumferentially extending channel. The retainer is disposed in the circumferentially extending channel and the collar includes a lock portion slidably disposed in the axially extending channel.

In some configurations, the power tool includes a first axis of rotation, and the accessory includes a tool having a second axis of rotation. The first and second axes of rotation define a plane. The key feature is offset from the plane by an angle.

In some configurations, the angle is between ten degrees and eighty degrees.

In some configurations, the angle is substantially equal to forty-five degrees.

In some configurations, the accessory includes a housing having first and second clamshells, the first and second clamshells including first and second mating surfaces, respectively, and wherein the key feature is offset from at least one of the first and second mating surfaces by an angle.

According to another particular aspect, the present disclosure provides a power tool accessory. The power tool accessory may include a housing and a retainer. The housing may define an inner chamber and may be configured for removably coupling the accessory to a power tool. The retainer may be disposed within the inner chamber and may include an inwardly projecting key feature configured to engage the power tool.

According to yet another particular aspect, the present disclosure provides a power tool. The power tool may include a housing, an output shaft and an accessory. The housing may include a neck portion and a collar portion. The neck portion may include a first outer surface defining a first diameter and having a plurality of indexing features formed therein. The collar portion may include a second outer surface defining a second diameter greater than the first diameter. The output shaft may be supported by the housing and define an axis of rotation. The accessory may be removably coupled to the output shaft and may include a retainer. The retainer may include a radially inwardly extending key feature disposed between the housing and the collar. The key feature may be configured to engage one of the plurality of indexing features to allow the accessory to rotate about the axis of rotation.

According to yet another particular aspect, the present disclosure provides a method of attaching an attachment accessory to a power tool power. The power tool may include a motor and an output shaft driven by the motor. The power tool may further include a neck portion defining a first diameter, a collar portion having an outer circumferential surface defining a second diameter greater than the first diameter, and a recess in the outer circumferential surface. The attachment accessory may include a retainer with a key feature. The method may include aligning the key feature with the recess. The method may further include moving the attachment accessory towards the power tool so that the key feature passes past the collar portion through the recess. The method may also include rotating the attachment accessory so that the key feature is no longer aligned with the recess and the collar portion restricts movement of the attachment accessory away from the power tool. In some configurations, the attachment accessory may further include a movable lock portion which can be moved into a locking position to restrict movement of the key feature. The method may further include moving the lock portion to the locking position after the rotating the attachment accessory so that the key feature is no longer aligned with the recess.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a partial perspective view of another power tool accessory in accordance with the principles of the present disclosure;

FIG. 7 is an exploded perspective view of a portion of another power tool accessory in accordance with the principles of the present disclosure;

FIG. 8 is a partial cross-sectional view of another power tool accessory in accordance with the principles of the present disclosure;

FIG. 9 is an end view of a portion of another power tool accessory in accordance with the principles of the present disclosure;

Corresponding reference numerals indicate corresponding parts throughout the several views of the drawings.

DETAILED DESCRIPTION

Figure 1:
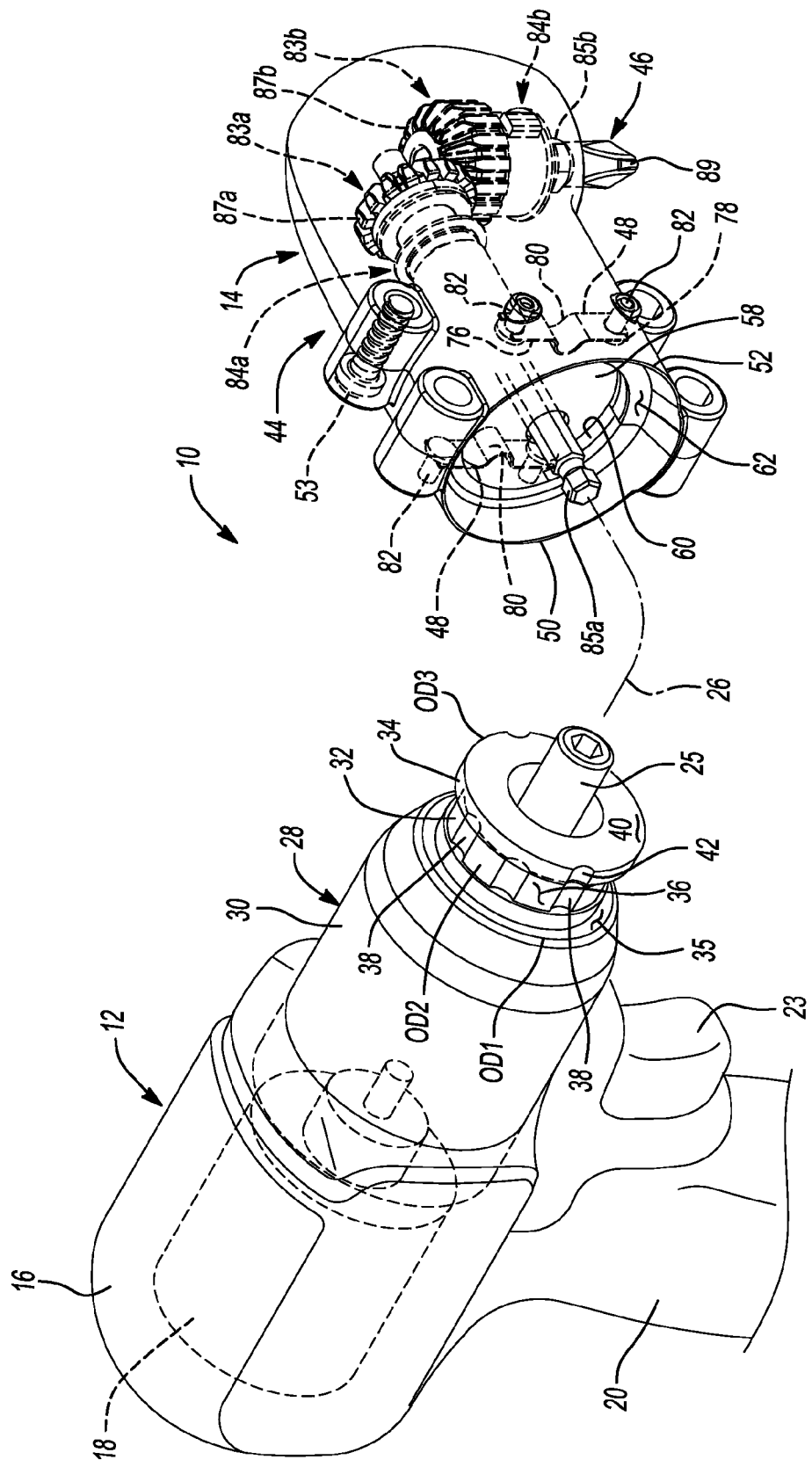
FIG. 1 is an exploded view of a power tool and a power tool accessory in accordance with the principles of the present disclosure.

Example embodiments will now be described more fully with reference to the accompanying drawings. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
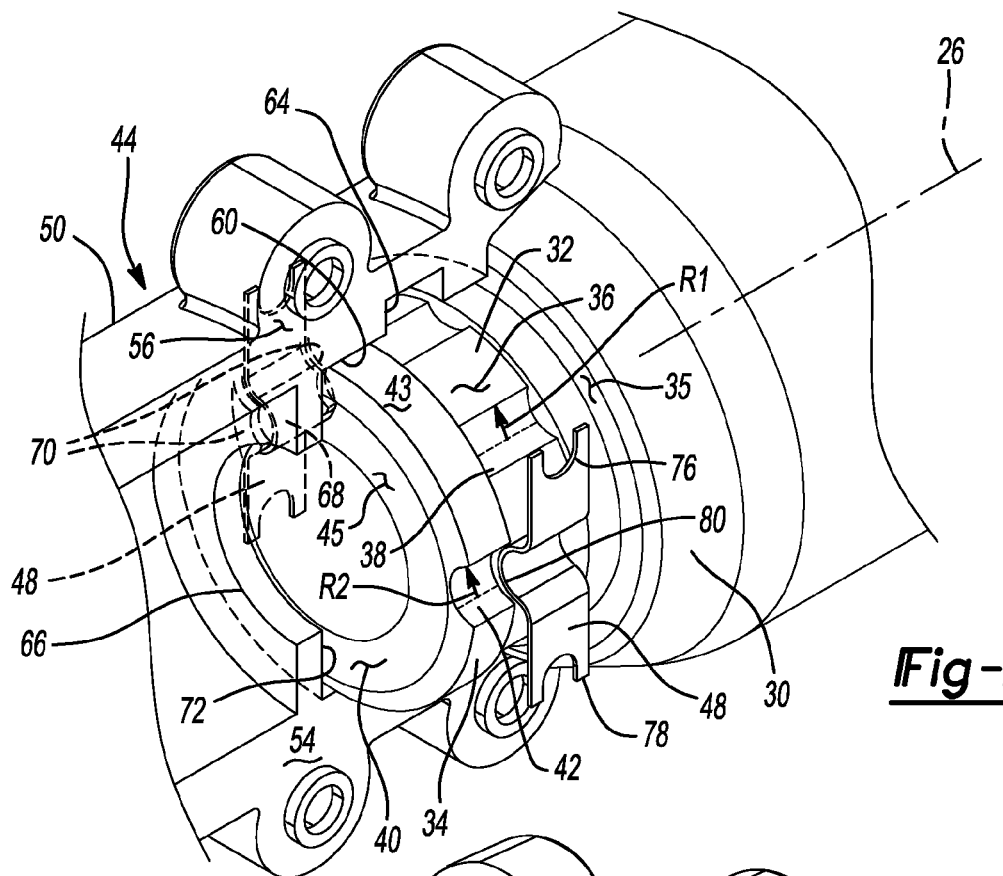
FIG. 2 is a partial perspective view of the power tool and power tool accessory system of FIG. 1 with a portion of the accessory removed for clarity.

With reference to FIGS. 1 and 2, a power tool 12 and a power tool accessory 14 are provided in accordance with the principles of the present disclosure. While the power tool 12 shown in the figures is a power drill, the power tool 12 can be any other type of power tool such as a multi tool, a screwdriver, an impact driver, a hammer drill, or a sander, for example.

The power tool 12 may include a housing 16 which surrounds a motor 18. The housing 16 includes a handle 20 which may engage a power source (not shown) coupled with the handle. The power source may be a battery, an AC cord, a pneumatic line, or other suitable power source otherwise known in the art. An activation member (e.g., a trigger or switch) 23 is electrically coupled with the motor 18 and the power source. The activation member 23 energizes and de-energizes the motor 18. The motor 18 may be drivingly coupled with a gear system (not shown) that transmits power to an output shaft 25.

The gear system may be surrounded by a gear case 28 and may drive the shaft 25 to rotate about an axis 26. As illustrated in FIGS. 1 and 2, the gear case 28 may include a body portion 30, a neck portion 32 and a flange or collar portion 34. While the body, neck and collar portions 30, 32, 34 of the gear case 28 are described as being separate elements of the gear case 28, it will be appreciated that the body, neck and collar portions 30, 32, 34 may be a monolithic construct within the scope of the present disclosure. The body portion 30 may extend from the housing 16 and may include a first stop surface 35 defining a first width or diameter OD1. The neck portion 32 may extend from the body portion 30, and may define a substantially cylindrical construct having a second diameter OD2 that is smaller than the first diameter OD1. A peripheral surface 36 of the neck portion 32 may include a plurality of equally sized and spaced indexing features 38, defining an annular spline configuration. In some configurations, the indexing features 38 may include substantially semi-cylindrical detents, each defining a radius R1. It will be appreciated, however, that the indexing features 38 may have other shapes (e.g., hemi-spherical) within the scope of the present disclosure.

The collar portion 34 of the gear case 28 may extend from the neck portion 32. The collar portion 34 may define a substantially cylindrical construct having a third diameter OD3 that is greater than the second diameter OD2 of the neck portion 32. In this regard, the neck portion 32 may define an annular groove or channel between the collar portion 34 and the first stop surface 35. The collar portion 34 may further include a second stop surface 40, one or more detents or recesses 42, a peripheral surface 43, and a tapered or chamfered leading edge 45 (FIG. 2). The second stop surface 40 may oppose the first stop surface 35. The recess 42 may be formed in, and extend radially into, the peripheral surface 43 of the collar portion 34. As illustrated in FIG. 2, the recess 42 may be substantially semi-cylindrical and may have a radius R2. As illustrated, in some configurations, the collar portion 34 may include two recesses 42. It will be appreciated, however, that the collar portion 34 may include more or less than two recesses 42 within the scope of the present disclosure. Each of the recesses 42 may be substantially aligned with one of the indexing features 38. In some configurations, the radius R1 of the indexing features 38 may be substantially equal to the radius R2 of the recesses 42. The chamfered leading edge 45 may extend from and between the second stop surface 40 and the peripheral surface 43.

Referring now to FIGS. 1 and 2, the accessory 14 may include a housing 44, a tool subassembly 46 and one or more retainers 48. As will be described in more detail below, the accessory 14 may be mounted or otherwise coupled to the gear case 28 and/or the housing 16 of the power tool 12, such that rotation of the shaft 25, in turn, drives the movement (e.g., rotation) of the tool subassembly 46. While the tool subassembly 46 is illustrated as a being a right angle drill/driver, it will be appreciated that the tool subassembly 46 may have other configurations (e.g., a corkscrew, saw, sander, etc.) within the scope of the present disclosure.

The housing 44 may include first and second clamshells 50, 52, that may be fastened together by screws 53 or other fasteners or by a snap fit, for example. The second clamshell 52 may be substantially similar to the first clamshell 50. Accordingly, except as otherwise provided, references to the first clamshell 50 will be understood to apply equally to the second clamshell 52, and like reference numerals will be used hereinafter and in the drawings to identify similar features and components on both the first and second clamshells 50, 52.

Figure 2A:
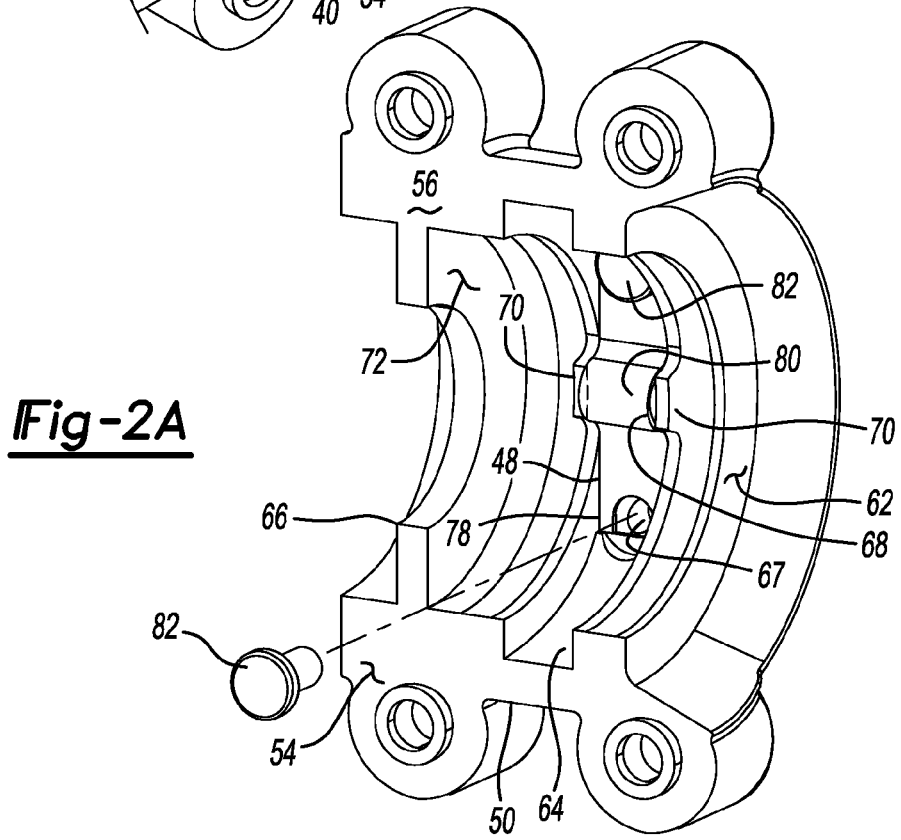
FIG. 2A is a partial perspective view of the power tool accessory of FIG. 1.

As shown in FIG. 2, the first and second clamshells 50, 52 may each include first and second mating surfaces 54, 56, such that a sidewall 60 of the first and second clamshells define a cutout portion or chamber 58 (FIG. 1). As will be explained in more detail below, in an assembled configuration, the chamber 58 receives a portion of the power tool 12 and/or the tool subassembly 46. The sidewall 60 of the first clamshell 50 may define a third stop surface 62, and may further include a groove or channel 64 and an annular rib or flange 66. As shown in FIGS. 2 and 2A, the channel 64 may include a plurality of radially outwardly extending apertures 67 and radially inwardly extending projections 68 each having flanged or lipped ends 70. Each of the projections 68 may be disposed between a pair of the threaded apertures 67. The flange 66 may define a fourth stop surface 72 abutting the second stop surface 40 (FIG. 2) of the collar portion 34.

In one configuration, the retainers 48 may be or include biasing members, such as leaf springs. In this regard, the retainers 48 may be constructed of spring steel, or any other resiliently flexible material. The retainers 48 may include forked ends 76, 78 and a lobe or key feature 80 therebetween. As illustrated in FIGS. 1 and 2, in the assembled configuration, the accessory 14 may include two retainers 48, each disposed within the channel 64 of the respective first and second clamshells 50, 52. The retainers 48 may be disposed within the channel 64 such that the key feature 80 substantially straddles the projection 68, and the lipped ends 70 abut opposing sides of the key feature 80 (FIGS. 2 and 2A). With reference to FIGS. 1 and 2A, in some configurations, screws 82, bolts, or other similar mechanical fasteners engage threaded apertures 67 to secure the forked ends 76, 78 of the retainers 48 to the first and second clamshells 50, 52.

The tool subassembly 46 may be coupled or otherwise mounted to the housing 44. As illustrated in FIG. 1, a right angle drill tool subassembly 46 may include a first gear member 83a, a second gear member 83b, a first bearing assembly 84a, and a second bearing assembly 84b. The first and second bearing assemblies 84a, 84b may be mounted within the housing 44.

The first gear member 83a may be rotatably coupled to the first bearing assembly 84a, and may include a first spindle portion 85a and a first gear portion 87a. The first spindle portion 85a may extend into the chamber 58 of the housing 44, and may be sized and shaped to mate with the shaft 25 of the power tool 12, such that the shaft 25 can drive the rotation of the first gear member 83a. In this regard, in one configuration, the shaft 25 may include a hexagonal socket, and the first spindle portion 85a may define a hexagonal cross section similarly sized and shaped as the hexagonal socket.

The second gear member 83b may be rotatably coupled to the second bearing assembly 84b, and may include a second spindle portion 85b and a second gear portion 87b. In an assembled configuration, the first gear portion 87a may be meshingly engaged with the second gear portion 87b, such that rotation of the first gear portion 87a drives the rotation of the second gear portion 87b. As illustrated, a tool 89, such as a drill bit or screwdriver, can be coupled to the second gear member 83b. As previously noted, while the tool subassembly 46 is described and illustrated herein as being a right angle drill subassembly, it will appreciated that the tool subassembly 46 may include other configurations that can be coupled to and driven by the shaft 25, within the scope of the present disclosure.

In operation, the accessory 14 can be assembled to the power tool 12 by aligning the key features 80 of the retainers 48 with corresponding recesses 42 of the collar portion 34, and pushing or otherwise moving the accessory 14 along the axis 26 relative to the power tool 12 until the retainers 48 are aligned with the neck portion 32, and the shaft 25 is coupled to the first spindle portion 85a of the first gear member 83a. To lock the accessory 14 to the power tool 12, the user can rotate the accessory 14 about the axis 26, such that key features 80 are not aligned with the recesses 42. In this regard, the key features 80 may be rotated into alignment with one of the indexing features 38, such that the user can change the position of the tool subassembly 46 relative to the power tool 12 by selecting a desired indexing feature 38, or combination of indexing features, to receive the key features 80 of the retainer 48. In the assembled configuration, the third stop surface 62 may abut the first stop surface 35, and the fourth stop surface 72 may abut the second stop surface 40 (FIG. 2).

When the user rotates the accessory 14 relative to the power tool 12, the retainers 48 resiliently flex outward and inward as the key features 80 respectively disengage and engage the indexing features 38. The inward biasing force of the retainers 48 keep the key features 80 removably engaged with corresponding indexing features 38. To rotate or index the accessory 14 relative to the power tool 12, the user must overcome the spring force of the retainers 48 to disengage the key features 80 from indexing features 38 as the key features 80 are moved between adjacent indexing features 38. To remove the accessory 14 from the power tool 12, the user can rotate the accessory 14 about the axis 26 such that the key features 80 are aligned with the recesses 42 in the collar portion 34. Once the key features 80 are aligned with the recesses 42, the user can slide the accessory 14 along or parallel to the axis 26 to remove the accessory 14 from the power tool 12.

Figure 3:
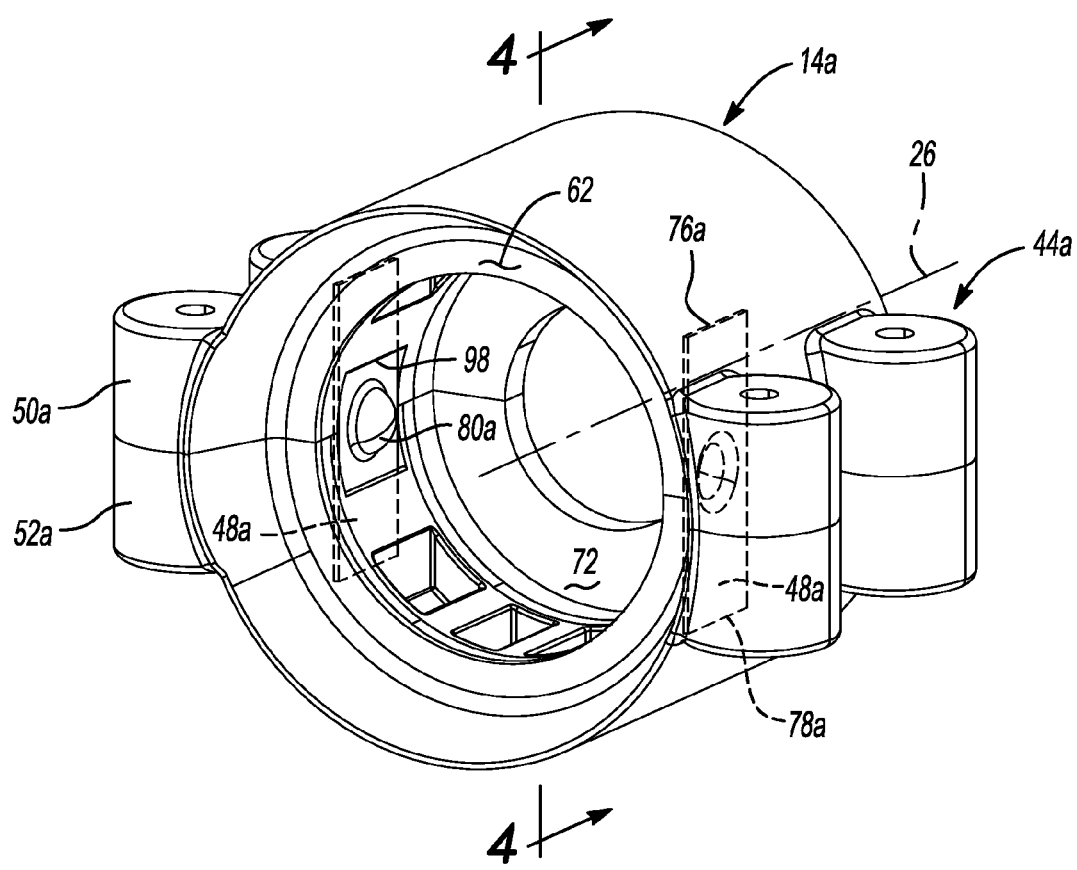
FIG. 3 is a perspective view of a portion of another power tool accessory in accordance with the principles of the present disclosure.
Figure 4:
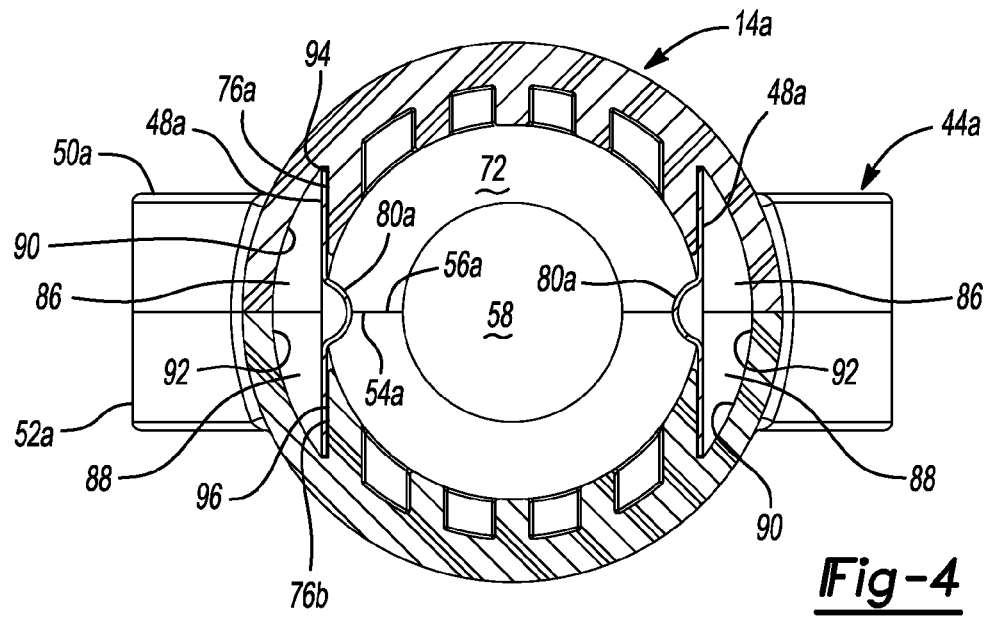
FIG. 4 is a cross-sectional view of the power tool accessory of FIG. 3, taken through the line 4-4.
Figure 5:
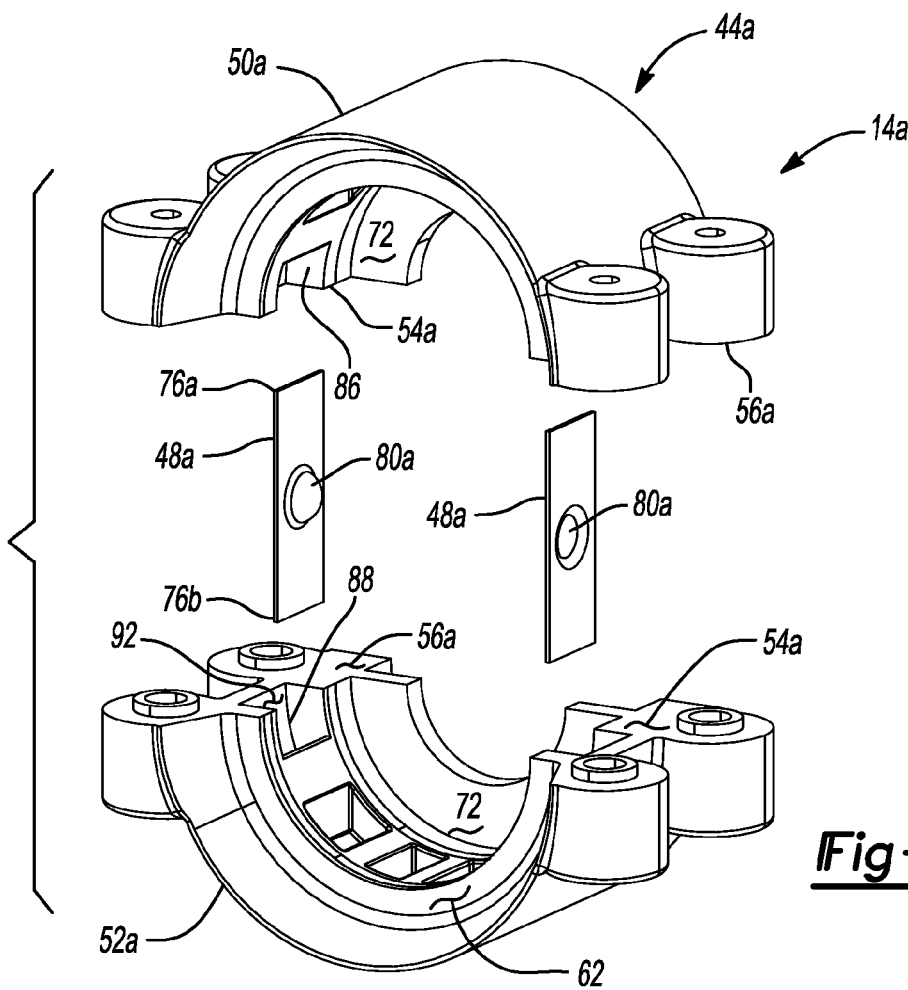
FIG. 5 is an exploded perspective view of the power tool accessory of FIG. 3.

With reference to FIGS. 3-5, another accessory 14a is provided that may be used with the power tool 12 instead of the accessory 14. The accessory 14a may include a housing 44a and one or more retainers 48a. The structure and function of the housing 44a and the retainers 48a may be similar or identical to the structure and function of the housing 44 and the retainer 48 described above, apart from any exceptions described below and/or shown in the figures. Accordingly, similar features will not be described again in detail. Like reference numerals are used hereinafter and in the drawings to identify like components while like reference numerals containing letter extensions are used to identify those components that have been modified. While not necessarily shown in FIGS. 3-5, it will be appreciated that the housing 44a may be shaped, sized and/or otherwise configured to accommodate any shafts, gears, tools and/or other features of a given type of accessory. It will also be appreciated that the retainers 48a may be used with the housing 44, and the housing 44a may be used with the retainers 48.

The mating surfaces 54a, 56a of the first clamshell 50a may each include a first pocket 86, and the mating surfaces 54a, 56a of the second clamshell 52a may each include a second pocket 88. The first and second pockets 86, 88 may include first surfaces 90, 92, respectively, generally facing the chamber 58, and second surfaces 94, 96, respectively, generally facing the first surfaces 90, 92. The first surfaces 90, 92 may have a concave profile, while the second surfaces 94, 96 may have a substantially planar profile. In an assembled configuration, the mating surfaces 54a, 56a of the first clamshell portion 50a may be coupled to the mating surfaces 54a, 56a, respectively, of the second clamshell portion 52a. In the assembled configuration, the first surfaces 90, 92 of the first clamshell portion 50a may define a contiguous arc with the first surfaces 90, 92, respectively, of the second clamshell portion 52. The second surfaces 94, 96 of the first and second clamshell portions 50a, 52a may define windows or apertures 98 respectively, therebetween.

Each retainer 48a may include a key feature 80a. As illustrated, the key feature 80a may define a portion of a sphere, for example. In this regard, in some configurations, the key feature 80a defines a substantially hemispherical detent. As illustrated in FIG. 4, in the assembled configuration, the ends 76a, 78a of the retainer 48a may be disposed within the first and second pockets 86, 88 of the first and second clamshells 50a, 52a, respectively, such that the key features 80a are aligned with, and extend through, the apertures 98.

To assemble the accessory 14a onto the power tool 12, the user may move the accessory 14a along the axis 26 until the key features 80a contacts the collar portion 34 of the power tool 12. As the user continues to move the accessory 14a along the axis 26, the collar portion 34 may slide along the key feature 80a, biasing the key feature 80a in a direction substantially perpendicular to the axis 26. In this regard, the retainer 48a may conform to the shape or profile of the first surfaces 90, 92 of the first and second pockets 86, 88. Once the key feature 80a has moved sufficiently past the collar portion 34, the retainer 48a may resiliently return to its original configuration (FIG. 4), such that the key feature 80a is disposed between the first and second stop surfaces 35, 40 and within one of the indexing features 38.

With reference to FIG. 6, another accessory 14b is provided that may be used with the power tool 12 instead of the accessory 14. The accessory 14b may include a housing 44b and a retainer 48b. The structure and function of the housing 44b and the retainer 48b may be similar or identical to the structure and function of the housing 44 and the retainer 48 described above, apart from any exceptions described below and/or shown in the figures. Accordingly, similar features will not be described again in detail. Like reference numerals are used hereinafter and in the drawings to identify like components while like reference numerals containing letter extensions are used to identify those components that have been modified. While not necessarily shown in FIG. 6, it will be appreciated that the housing 44b may be shaped, sized and/or otherwise configured to accommodate any shafts, gears, tools and/or other features of a given type of accessory. It will also be appreciated that the retainer 48b may be used with any of the housings described herein, and the housing 44b may be used with any of the retainers described herein.

The first clamshell 50b and the second clamshell (not shown) may each include a channel 64b. The channel 64b may include a pair of teeth or heat stake elements 102 extending in a direction substantially perpendicular to the axis 26. The retainer 48b may include a pair of apertures 103. In an assembled configuration, the heat stake elements 102 may extend through the apertures 103. The heat stake elements 102 may then be melted to secure the retainers 48b to the first and second clamshells 50b, 52b.

With reference to FIG. 7, another accessory 14c is provided that may be used with the power tool 12 instead of the accessory 14. The accessory 14c may include the housing 44b and a retainer 48c. The function of the retainer 48c may be generally similar to the function of the retainer 48 described above, apart from any exceptions described below and/or shown in the figures. While the accessory 14c is shown in FIG. 7 as including the housing 44b, it will also be appreciated that the retainer 48c could, alternatively, be used with either of the housings 44, 44a, for example.

The retainer 48c may be formed into a substantially circular or ring shape extending between first and second ends 104, 106. The retainer 48c may have an inner diameter ID4 that is substantially equal to, but slightly greater than, the third diameter OD3 of the collar portion 34 of the power tool 12 (FIG. 1). The retainer 48c may further include an inwardly projecting, annular key feature 80c. The key feature 80c may define a radially extending projection on an inner surface 107 of the retainer 48c. As illustrated, in some configurations, the key feature 80c defines a substantially semi-cylindrical projection.

When the first clamshell portion 50a is assembled to the second clamshell portion 52a, the retainer 48c may become trapped or otherwise secured within the channel 64c. To assemble the accessory 14c onto the power tool 12, the user may move the accessory 14c along the axis 26 until the key feature 80c contacts the collar portion 34 of the power tool 12. As the user continues to move the accessory 14c along the axis 26, the collar portion 34 may slide along the key feature 80c, urging the key feature 80c radially outward in a direction substantially perpendicular to the axis 26, such that the first end 104 moves away from the second end 106 to increase the inner diameter ID4. Once the key feature 80c has moved sufficiently past the collar portion 34, the retainer 48c may resiliently return to its original configuration, such that the key feature 80c is disposed between the first and second stop surfaces 35, 40. Interference between the key feature 80c and the collar portion 34 prevents the accessory 14c from sliding off of the power tool 12 within application of sufficient force to cause key feature 80c to expand outward to a sufficient extent to allow removal of the accessory 14c from the power tool 12.

With reference to FIG. 8, another accessory 14d is provided that may be used with the power tool 12 instead of the accessory 14. The accessory 14d may include a housing 44d and a retainer 48d. The structure and function of the housing 44d and the retainer 48d may be similar or identical to the structure and function of the housing 44 and the retainer 48 described above, apart from any exceptions described below and/or shown in the figures. Accordingly, similar features will not be described again in detail. Like reference numerals are used hereinafter and in the drawings to identify like components, while like reference numerals containing letter extensions are used to identify those components that have been modified.

The housing 44d may include an aperture 106 extending in a radial direction substantially perpendicular to the axis 26. A button assembly 109 may be disposed within the aperture 106. The button assembly 109 may include a button 110 and a biasing member 112. The button 110 may include a stem portion 114 and a tip 116. In an assembled configuration, the stem portion 114 may be disposed within the aperture 106. The tip 116 may be generally wedge shaped. The biasing member 112 may be a helical spring concentrically disposed about the stem portion 114.

The retainer 48d may be formed into a generally rectangular shape extending between first and second arcuately extending ends 118d, 120d. The retainer 48d may define an inner width W1 that is less than the third diameter OD3 of the collar portion 34 of the power tool 12. When clamshell portions of the housing 44d are assembled together as previously described, the first and second ends 118d, 120d may be substantially aligned with the aperture 106 and with the tip 116 of the button 110. To assemble the accessory 14d onto the power tool 12, the user may move the accessory 14d along the axis 26 until the retainer 48d contacts the collar portion 34 of the power tool 12. The user may then press the button 110 such that the tip 116 contacts, and extends between, the first and second ends 104d, 106d, thereby causing the first end 104d to move away from the second end 106d. As the first end 104d moves away from the second end 106d, the width W1 of the retainer 48d will increase such that the width W1 is greater than the third diameter OD3 of the collar portion 34, thereby allowing the user to move the retainer 48d into alignment with the annular groove or channel defined by the neck portion 32 of the gear case 28. Once the user releases the button 110, the biasing member 112 can bias the tip 116 out of engagement with the first and second ends 104*d*, 106*d* of the retainer 48*d*. In this regard, the retainer 48*d* may resiliently return to its original configuration such that the retainer 48*d* is disposed and secured between the collar portion 34 and the body portion 30 of the gear case 28 in a manner that restricts the accessory 14*d* from sliding off of the power tool 12. To release the accessory 14*d* from the power tool 12, the user may press the button 110 such that the tip 116 increases the width W1 so that the width W1 is larger than the third diameter OD3 of the collar portion 34 in the manner described above, thereby allowing the retainer 48*d* to slide past the collar portion 34.

With reference to FIG. 9, another accessory 14*e* is provided that may be used with the power tool 12 instead of the accessory 14. The accessory 14*e* may include a retainer 48*e*. The structure and function of the retainer 48*e* may be similar or identical to that of the retainer 48*d* described above, apart from any exceptions described below and/or shown in the figures. Therefore, similar features will not be described again in detail. It will also be appreciated that the retainer 48*e* may be used with any of the housings 44, 44*a*, 44*b* described herein.

The retainer 48*e* may include opposed key features 80*e*. In operation, the accessory 14*e* can be assembled to the power tool 12 by aligning the key features 80*e* of the retainer 48*e* with the recesses 42 formed in the collar portion 34, and pushing or otherwise moving the accessory 14*e* along the axis 26 until the retainer 48*e* is aligned with the neck portion 32. To lock the accessory 14*e* to the power tool 12, the user can rotate the accessory 14*e* about the axis 26, such that key features 80*e* are not aligned with the recesses 42. In this regard, the key features 80*e* may be rotated into alignment with one of the indexing features 38, such that the user can change the position of the tool subassembly 46 relative to the power tool 12 by selecting a desired indexing feature 38, or combination of indexing features, to receive the key features 80*e* of the retainer 48. To remove the accessory 14*e* from the power tool 12, the user can rotate the accessory 14*e* about the axis 26 such that the key features 80*e* are aligned with the recesses 42 in the collar portion 34. Once the key features 80*e* are aligned with the recesses 42, the user can move the accessory 14*e* along or parallel to the axis 26 to remove the accessory 14*e* from the power tool 12.

With reference to FIGS. 10-12B, another accessory 14*f* is provided that may be used with the power tool 12 instead of the accessory 14. The accessory 14*f* may include a housing 44*f*, one or more retainers 48*f*, and a collar 128. The structure and function of the housing 44*f* and the retainers 48*f* may be similar or identical to the structure and function of the housing 44 and the retainer 48 described above, apart from any exceptions described below and/or shown in the figures. Accordingly, similar features will not be described again in detail. Like reference numerals are used hereinafter and in the drawings to identify like components while like reference numerals containing letter extensions are used to identify those components that have been modified. While not necessarily shown in FIGS. 10-12B, it will be appreciated that the housing 44*f* may be shaped, sized and/or otherwise configured to accommodate any shafts, gears, tools and/or other features of a given type of accessory.

The housing 44*f* may include first and second clamshells 50*f*, 52*f*, that may be fastened together by a clip 53*f*, other fasteners, or by a snap fit, for example. The second clamshell 52*f* may be substantially similar to the first clamshell 50*f*. Accordingly, except as otherwise provided, references to the first clamshell 50*f* will be understood to apply equally to the second clamshell 52*f*, and like reference numerals will be used hereinafter and in the drawings to identify similar features and components on both the first and second clamshells 50*f*, 52*f*.

The first clamshell 50*f* may include a hub portion 130 having a first or proximal end 132 and a second or distal end 134. In some configurations, the hub portion 130 may include a generally cylindrical construct extending axially from and between the proximal and distal ends 132, 134. The proximal end 132 may be integrally formed with the housing 44*f*. The distal end 134 may include a third stop surface 62*f*.

The hub portion 130 may further include an inner surface 136 and an outer surface 138. The inner surface 136 may include a radially inwardly projecting flange 66*f* and the retainer 48*f*. The flange 66*f* may include a fourth stop surface 72*f*. The retainer 48*f* may be located between the flange 66*f* and the distal end 134 of the hub portion 130 and may include a radially inwardly projecting key feature 80*f* and a lock member 141. In some configurations, the accessory 14*f* may include two retainers 48*f*, including two key features 80*g* and two lock members 141. The key feature 80*f* may include a window or aperture 142 and an axially extending lip 146, such that the aperture 142 includes a fifth diameter ID5, and a sixth diameter ID6 proximate to, and defined by, the lip 146. The sixth diameter ID6 may be smaller than the fifth diameter ID5. The lock member 141 may be located within the aperture 142 and may include a generally spherical member, such as a ball bearing, for example. In this regard, the lock member 141 may include a diameter OD9 that is larger than the sixth diameter ID6, and smaller than the fifth diameter ID5.

Figure 10:
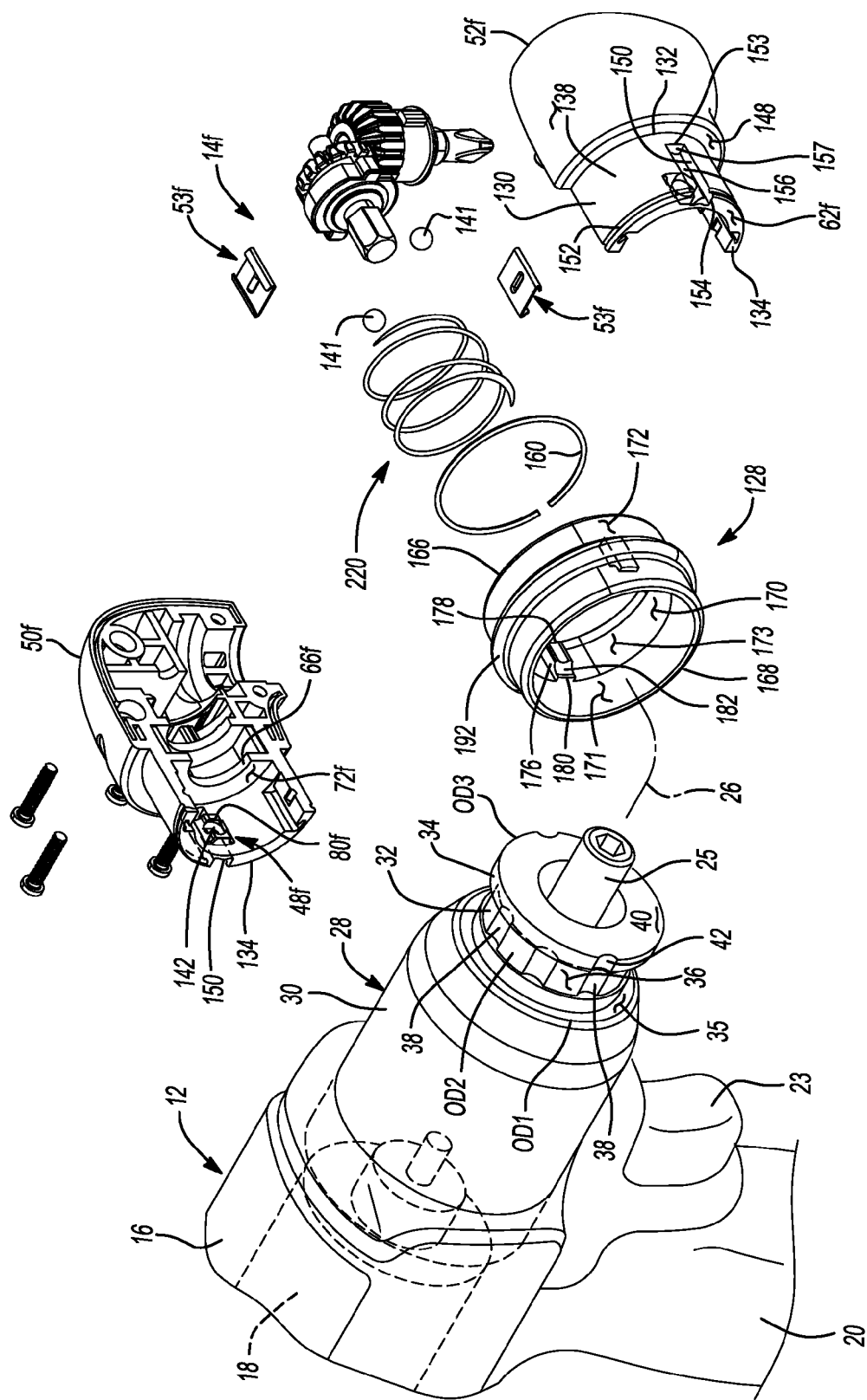
FIG. 10 is an exploded view of another power tool accessory in accordance with the principles of the present disclosure.
Figure 11:
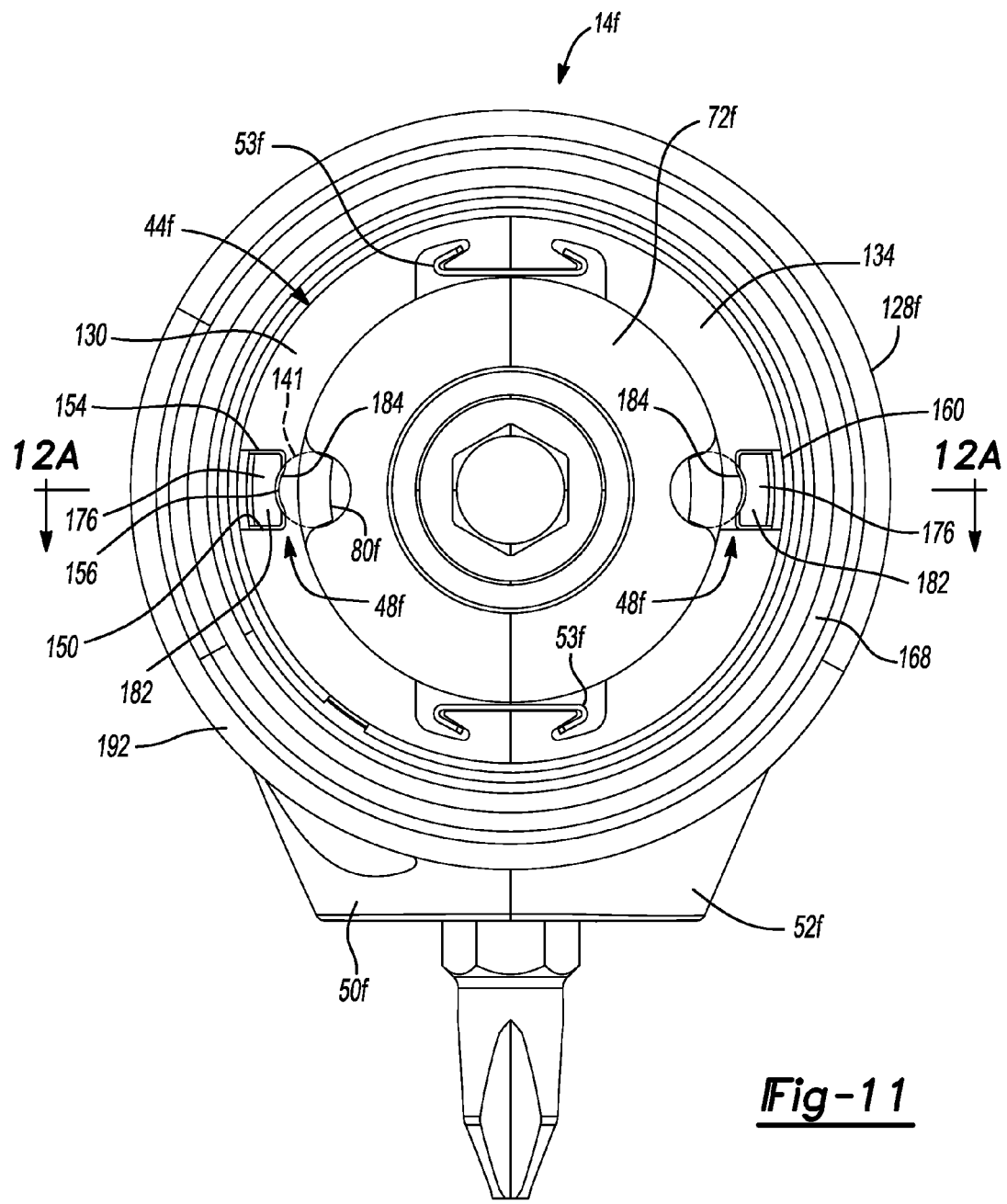
FIG. 11 is an end view of the power tool accessory of FIG. 10.

The outer surface 138 of the hub portion 130 may extend axially from the housing 44*f*, such that the housing 44*f* includes or otherwise defines a fifth stop surface 148 at the proximal end 132 of the hub portion 130. In an assembled configuration, the fifth stop surface 148 may extend circumferentially about the hub portion 130. The outer surface 138 may include a first groove or channel 150 and a second groove or channel 152. The first channel 150 may extend axially and may include a first or proximal end 153, a second or distal end 154, and an axially extending surface 156. The proximal end 151 may include a sixth stop surface 157 (FIG. 10). The distal end 154 may open into the distal end 134 of the hub portion 130. The aperture 142 may open into the first channel 150, such that the aperture 142 is in communication with the first channel 150. The axially extending surface 156 may include a convex or cylindrical profile.

Figure 12A:
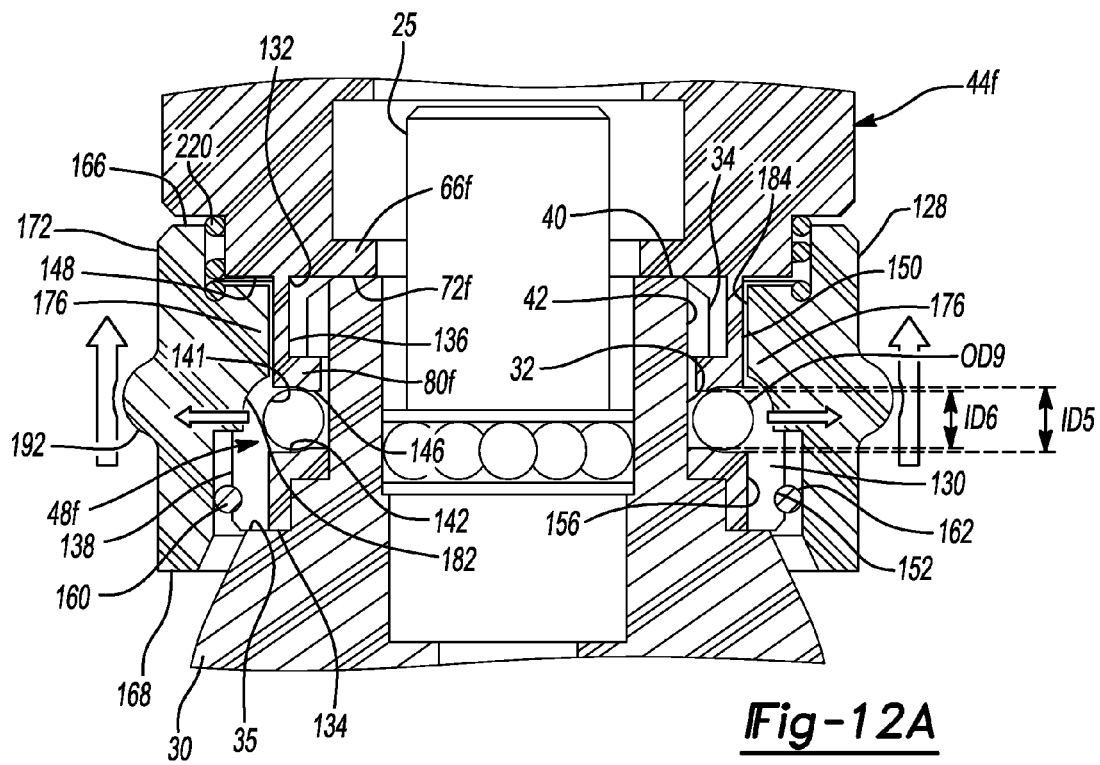
FIG. 12A is a cross-sectional view of the power tool accessory of FIG. 10 in a first position.
Figure 12B:
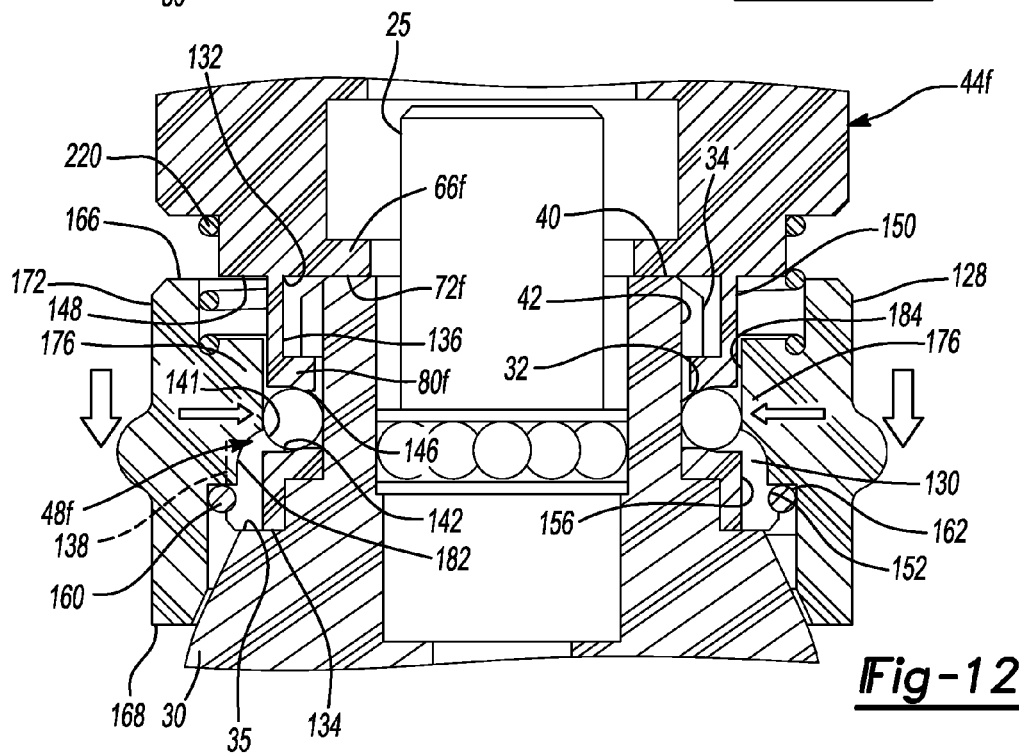
FIG. 12B is a cross-sectional view of the power tool accessory of FIG. 10 in a second position.
Figure 13:
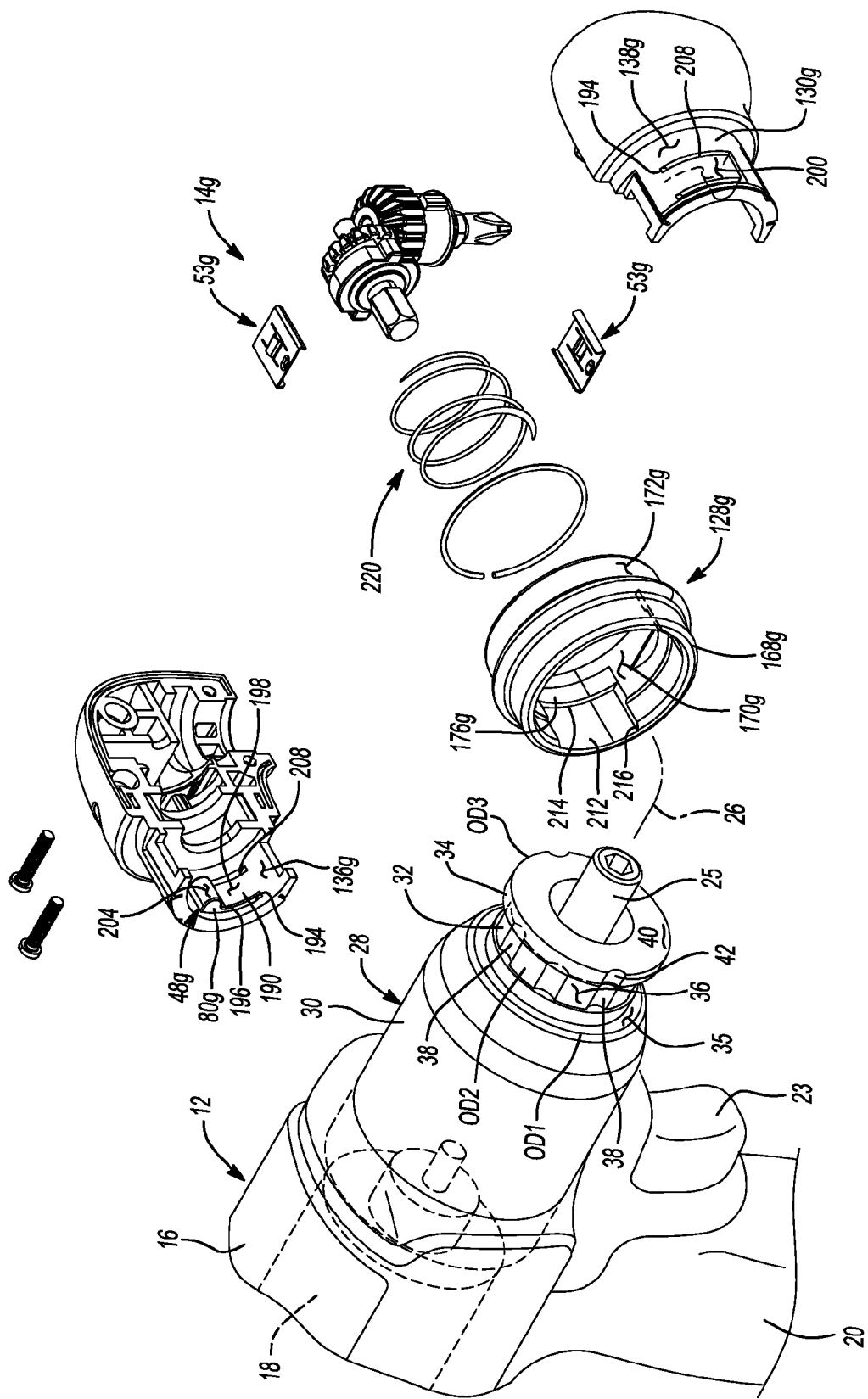
FIG. 13 is an exploded view of another power tool accessory in accordance with the principles of the present disclosure.
Figure 14:
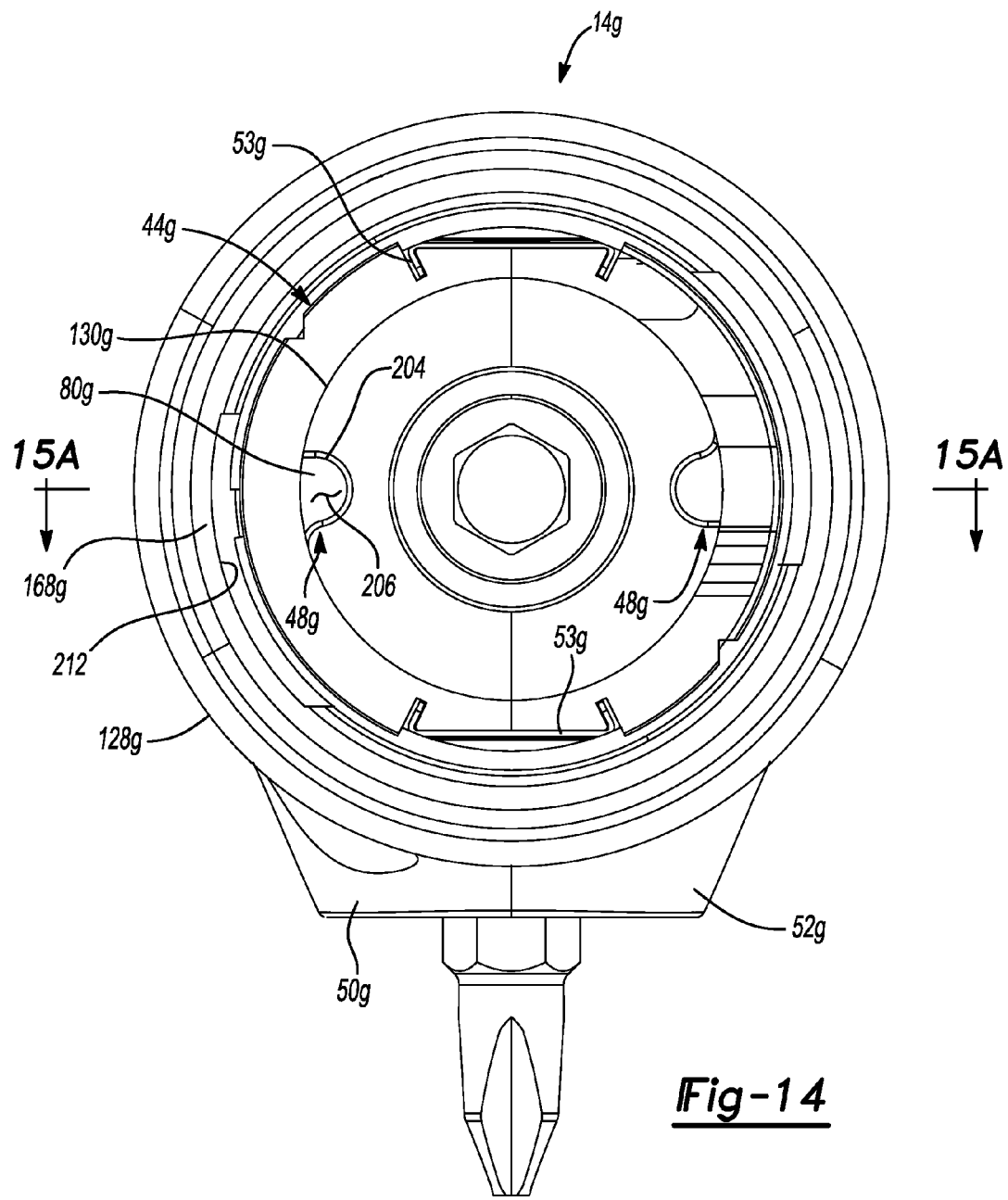
FIG. 14 is an end view of the power tool accessory of FIG. 13.

The second channel 152 may extend circumferentially about the outer surface 138, and may be located proximate to the distal end 134 of the hub portion 130. In this regard, the key feature 80*f* may be located between the second channel 152 and the fifth stop surface 148. With reference to FIGS. 12A and 12B, in an assembled configuration, a ring 160 may be positioned in the second channel 152. The ring 160 may extend radially outward beyond the outer surface 138, such that the ring 160 includes, or otherwise defines, a seventh stop surface 162. In this regard, it will also be appreciated that the ring 160 may also serve to secure the first clamshell 50*f* to the second clamshell 52*f*.

The collar 128 may have a generally cylindrical construct including a proximal end 166, a distal end 168, an inner surface 170 and an outer surface 172. The inner surface 170 may include a first portion 171 and a second portion 173. The first portion 171 may be a circumferential stop surface. In this regard, the first portion 171 may include a tapered or chamfered portion. The inner surface 170 may further include a radially inwardly projecting lock portion 176. In this regard, the lock portion 176 may project radially inwardly from the second portion 173 of the inner surface 170. As illustrated, in some configurations, the inner surface 170 may include two lock portions 176. The lock portion 176 may extend axially from a proximal end 178 to a distal end 180 and may include a ramp surface 182 and a lock surface 184. The ramp surface 182 may extend axially from the distal end 180, and may taper radially inwardly towards the proximal end 178. In this regard, the ramp surface 182 may be concave or otherwise include a cylindrical profile. The lock surface 184 may extend axially from the proximal end 178, and may be concave or otherwise include a cylindrical profile. The ramp surface 182 may join or otherwise meet the lock surface 184 between the proximal and distal ends 178, 180 of the lock portion 176.

The outer surface 172 of the collar 128 may include a gripping member or portion 192. As illustrated, in some configurations, the gripping portion 192 may include an annular rib projecting radially outward from the outer surface 172. As will be explained in more detail, below, the gripping portion 192 may allow the user to securely grasp and operate the collar 128.

In an assembled configuration, the collar 128 may be coupled to the housing 14*f*. In this regard, the collar 128 may be slidably disposed about the hub portion 130 of the first and second clamshells 50*f*, 52*f*, such that the lock portion 176 is received in the first channel 150, and the lock member 141 is secured between the lock portion 176 and the lip 146 of the key feature 80*f*. As will be explained in more detail below, in the assembled configuration, the collar 128 may be secured, and slidably disposed, between the fifth stop surface 148 of the housing 44*f* and the seventh stop surface 162 of the ring 160.

In operation, the accessory 14*f* can be assembled to the power tool 12 by aligning the key feature 80*f* with the corresponding recess 42 of the power tool 12, and pushing or otherwise moving the accessory 14*f* along the axis 26 relative to the power tool 12 until the key feature 80*f* is aligned with the neck portion 32 of the power tool 12. To secure the accessory 14*f* to the power tool 12, the user can rotate the accessory 14*f* about the axis 26, such that key feature 80*f* is not aligned with the recess 42. In this regard, the user can rotate the accessory 14*f* until the lock member 141 is aligned with one of the indexing features 38, such that the user can change the position of the tool subassembly 46 relative to the power tool 12 by selecting a desired indexing feature 38, or combination of indexing features, to receive the lock member 141.

With the collar 128 in a first or unlocked position (FIG. 12A), the ramp surface 182 of the lock portion 176 may engage the lock member 141, such that the lock member 141 does not extend radially inwardly beyond the lip 146 of the key feature 80*f*. In this regard, it will be appreciated that in the unlocked position, the accessory 14*f* may be rotatable on the power tool 12 about the axis 26. To lock the accessory 14*f* relative to the power tool 12, and thereby prevent the accessory from rotating about the axis 26, the user can slide or otherwise move the collar 128 along the axis 26 into a second or locked position (FIG. 12B). In the locked position, the lock surface 184 of the lock portion 176 may push the lock member 141 radially inwardly within the aperture 142 such that a portion of the lock member 141 extends radially inwardly beyond the lip 146 of the key feature 80*f*, and into engagement with the indexing feature 38. As illustrated, in the locked position, the collar 128 (e.g., the lock portion 176) may abut the seventh stop surface 162 of the ring 160 to prevent the collar 128 from disengaging the hub portion 130 of the housing 44*f*. As will be appreciated, the user can move the collar 128 back into the unlocked position to remove the accessory 14*f* from the power tool 12, or rotate the accessory 14*f* relative to the power tool 12.

With reference to FIGS. 13-15B, another accessory 14*g* is provided that may be used with the power tool 12 instead of the accessory 14. The accessory 14*g* may include a housing 44*g* and a collar 128*g*. The structure and function of the housing 44*g* and the collar 128*g* may be similar or identical to the structure and function of the housing 44*f* and the collar 128 described above, apart from any exceptions described below and/or shown in the figures. Accordingly, similar features will not be described again in detail. Like reference numerals are used hereinafter and in the drawings to identify like components while like reference numerals containing letter extensions are used to identify those components that have been modified. While not necessarily shown in FIGS. 13-15B, it will be appreciated that the housing 44*g* may be shaped, sized and/or otherwise configured to accommodate any shafts, gears, tools and/or other features of a given type of accessory.

The housing 44*g* may include first and second clamshells 50*g*, 52*g* that may be fastened together by a clip 53*g*, other fasteners, or by a snap fit, for example. The second clamshell 52*g* may be substantially similar to the first clamshell 50*g*. Accordingly, except as otherwise provided, references to the first clamshell 50*g* will be understood to apply equally to the second clamshell 52*g*, and like reference numerals will be used hereinafter and in the drawings to identify similar features and components on both the first and second clamshells 50*g*, 52*g*.

The hub portion 130*g* may include a retainer 48*g*. The retainer 48*g* may include an arm portion 190 and a key feature 80*g*. The arm portion 190 may include a proximal end 194, a distal end 196, an inner surface 198 and an outer surface 200. The proximal end 194 of the arm portion 190 may be coupled to the hub portion 130*g*. In this regard, in some configurations the arm portion 190 may be integrally and monolithically formed with the hub portion 130*g*. The arm portion 190 may extend in a circumferential direction about the hub portion 130*g*, such that the inner surface 198 of the arm portion 190 may be flush with the inner surface 136*g* of the hub portion 130*g*, and the outer surface 200 of the arm portion 190 may be flush with the outer surface 138*g* of the hub portion 130*g*.

The key feature 80*g* may be coupled to the distal end 196 of the arm portion 190 and may extend radially inwardly. In this regard, the key feature 80*g* may include a radiused or arcuate surface 204 and a radially extending stop surface 206. The stop surface 206 may be generally planar. The key feature 80*g* and the arm portion 190 may be separated from the hub portion 130*g* by a peripheral space or void 208. In this regard, the retainer 48*g* may be flexibly coupled to the hub portion 130*g*, such that the arm portion 190 and/or the key feature 80*g* can flex or otherwise bend within the void 208 relative to the hub portion 130*g*.

The collar 128*g* may have a generally cylindrical construct including an inner surface 170*g* and an outer surface 172*g*. The inner surface 170 may include a lock portion 176*g* and a groove or channel 212. In this regard, the channel 212 may at least partially define the lock portion 176*g*, such that the lock portion 176 extends radially inwardly relative to the channel 212. In some configurations, the inner surface 170*g* may include two channels 212. In this regard, it will be appreciated that the number of channels 212 may correspond to the number of retainers 48*g*. The channel 212 may include a proximal end 214 and a distal end 216. The distal end 216 of the channel 212 may open into the distal end 168g of the collar 128g.

In an assembled configuration, the collar 128g may be coupled to the housing 14g. In this regard, the collar 128g may be slidably disposed about the hub portion 130g of the first and second clamshells 50g, 52g, such that the channel 212 is aligned with at least a portion of the retainer 48g. As will be explained in more detail below, in a first position, the channel 212 may be radially and axially aligned with the key feature 80g of the retainer 48g.

In operation, the accessory 14g can be assembled to the power tool 12 by aligning the key feature 80g with the corresponding recesses 42 of the power tool 12, and pushing or otherwise moving the accessory 14g along the axis 26 relative to the power tool 12 until the key feature 80g is aligned with the neck portion 32 of the power tool 12. To secure the accessory 14g to the power tool 12, the user can rotate the accessory 14g about the axis 26, such that the key feature 80g is aligned with one of the indexing features 38. As the user rotates the accessory, the retainer 48g can flex or bend within the void 208 such that the key feature 80g can disengage a first indexing feature 38 and engage a second indexing feature 38. In this regard, the channel 212 can allow the retainer 48g to flex in a radially outward direction, such that at least a portion of the retainer 48g may enter, or otherwise be received by, the channel 212. In this way, the user can change the position of the tool subassembly 46 relative to the power tool 12 by selecting a desired indexing feature 38, or combination of indexing features, to receive the key feature 80g.

Figure 15A:
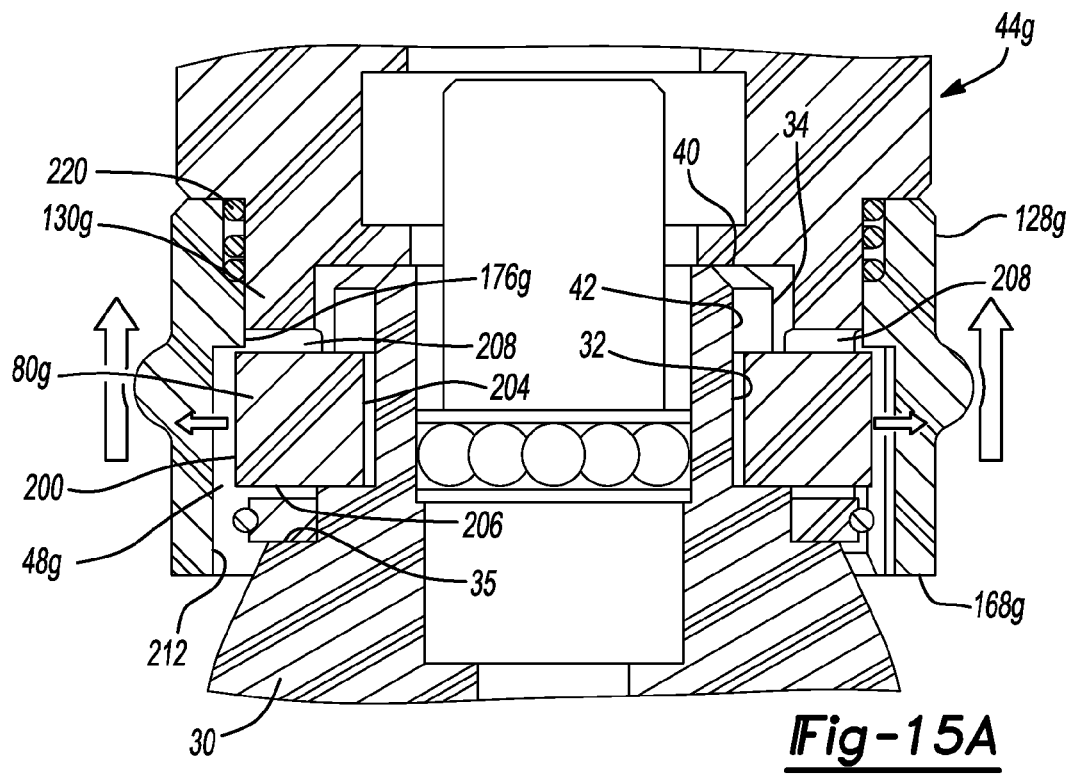
FIG. 15A is a cross-sectional view of the power tool accessory of FIG. 13 in a first position.
Figure 15B:
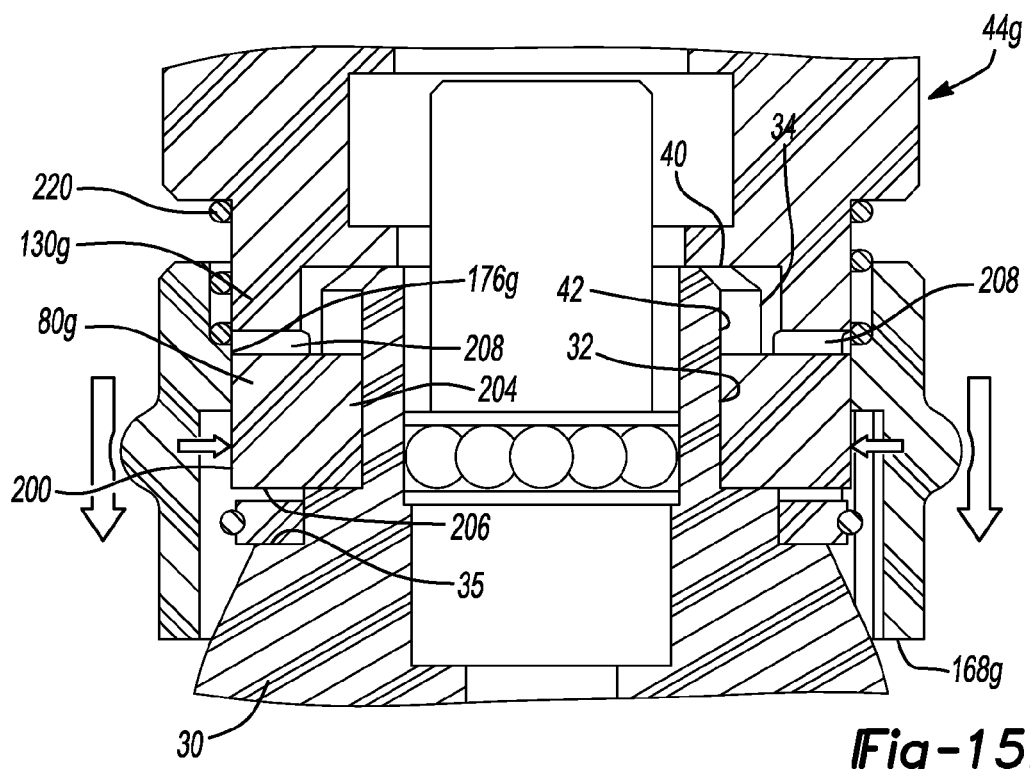
FIG. 15B is a cross-sectional view of the power tool accessory of FIG. 13 in a second position.

With the collar 128g in a first or unlocked position (FIG. 15A), the channel 212 may be aligned with the key feature 80g of the retainer 48g, such that the retainer 48g may flex or bend in the manner described above. In this regard, it will be appreciated that in the unlocked position, the accessory 14g may be rotatable on the power tool 12 about the axis 26. To lock the accessory 14g relative to the power tool 12, and thereby prevent the accessory from rotating about the axis 26, the user can slide or otherwise move the collar 128g along the axis 26 into a second or locked position (FIG. 15B). In the locked position, the lock portion 176g of the collar 128g may engage, or otherwise be aligned with, the outer surface 200 of the retainer 48g, such that at least a portion of the retainer 48g is no longer aligned with the channel 212. In this regard, the lock portion 176g of the collar 128g can prevent the retainer 48g from flexing in a radially outward direction, such that the key feature 80g is secured within the indexing feature 38, and the accessory 14g is prevented from rotating about the axis 26 relative to the power tool 12. The contact between the key feature 80g and the indexing feature 38 provides the user with tactile and/or audible feedback, which indicates that the attachment is in an orientation that the collar 128g can be moved into the locked position.

With reference to FIGS. 16-18B, another accessory 14h is provided that may be used with the power tool 12 instead of the accessory 14. Accessory 14h may include a housing 44h, a retainer 48h, and a collar 128h. The structure and function of the housing 44h, retainer 48h and collar 128h may be similar or identical to the structure and function of the housing 44f, retainer 48f and collar 128 described above, apart from any exceptions described below and/or shown in the figures. Accordingly, similar features will not be described again in detail. Like reference numerals are used hereinafter and in the drawings to identify like components, while like reference numerals containing letter extensions are used to identify those components that have been modified. While not necessarily shown in FIGS. 16-18B, it will be appreciated that the housing 44h may be shaped, sized and/or otherwise configured to accommodate any shafts, gears, tools and/or other features of a given type of accessory.

Figure 16:
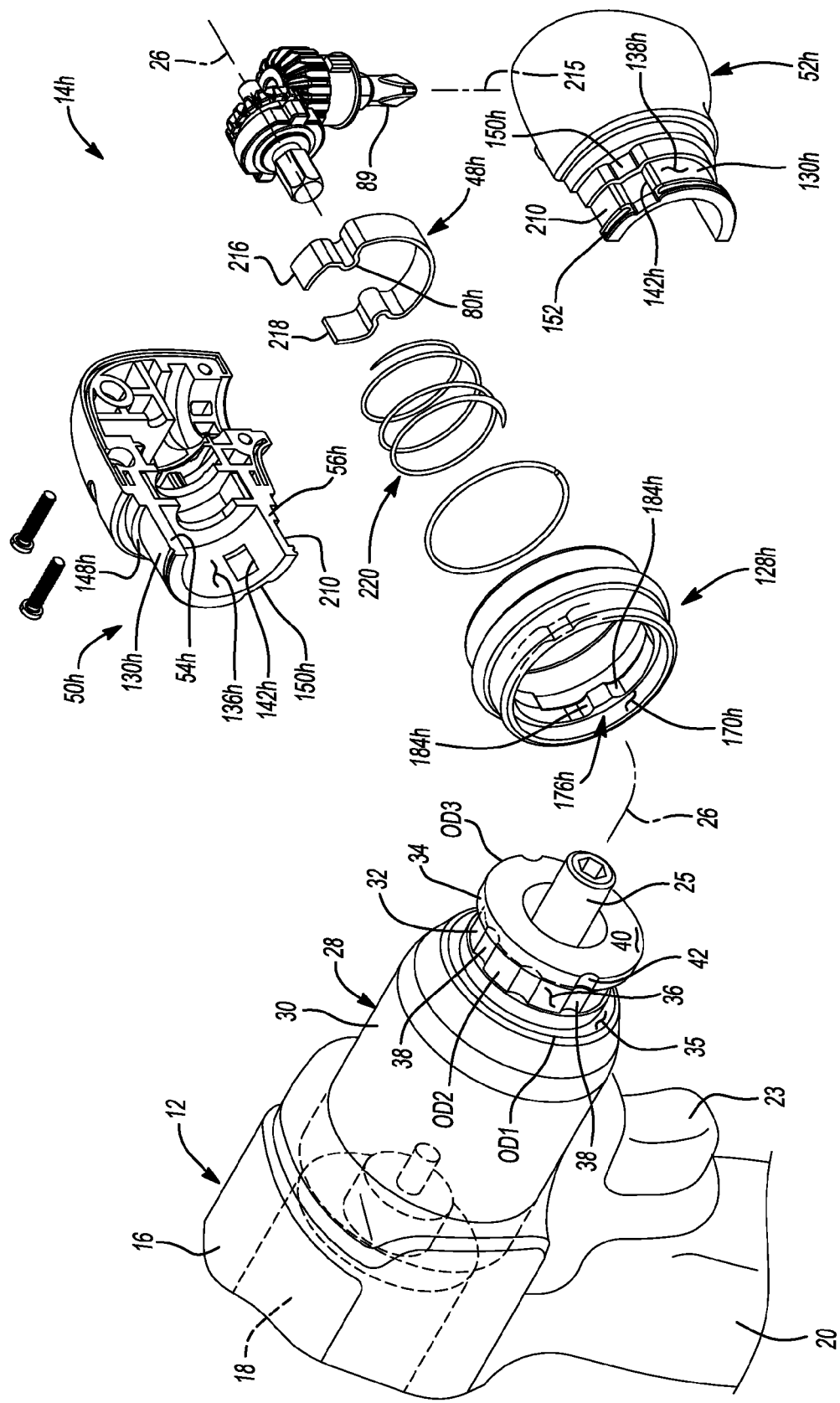
FIG. 16 is an exploded view of another power tool accessory in accordance with the principles of the present disclosure.

The hub portion 130h of the first and/or second clamshells 50h, 52h may include an inner surface 136h and an outer surface 138h. The outer surface 138h may extend axially from the housing 44h, and may include a first groove or channel 150h, the second groove or channel 152, and a third groove or channel 210. The third channel 210 may extend circumferentially about the outer surface 138 and intersect the first channel 150h. In this regard, the third channel 210 may extend in a direction substantially perpendicular to the first channel 150h, as illustrated in FIG. 16.

Figure 17:
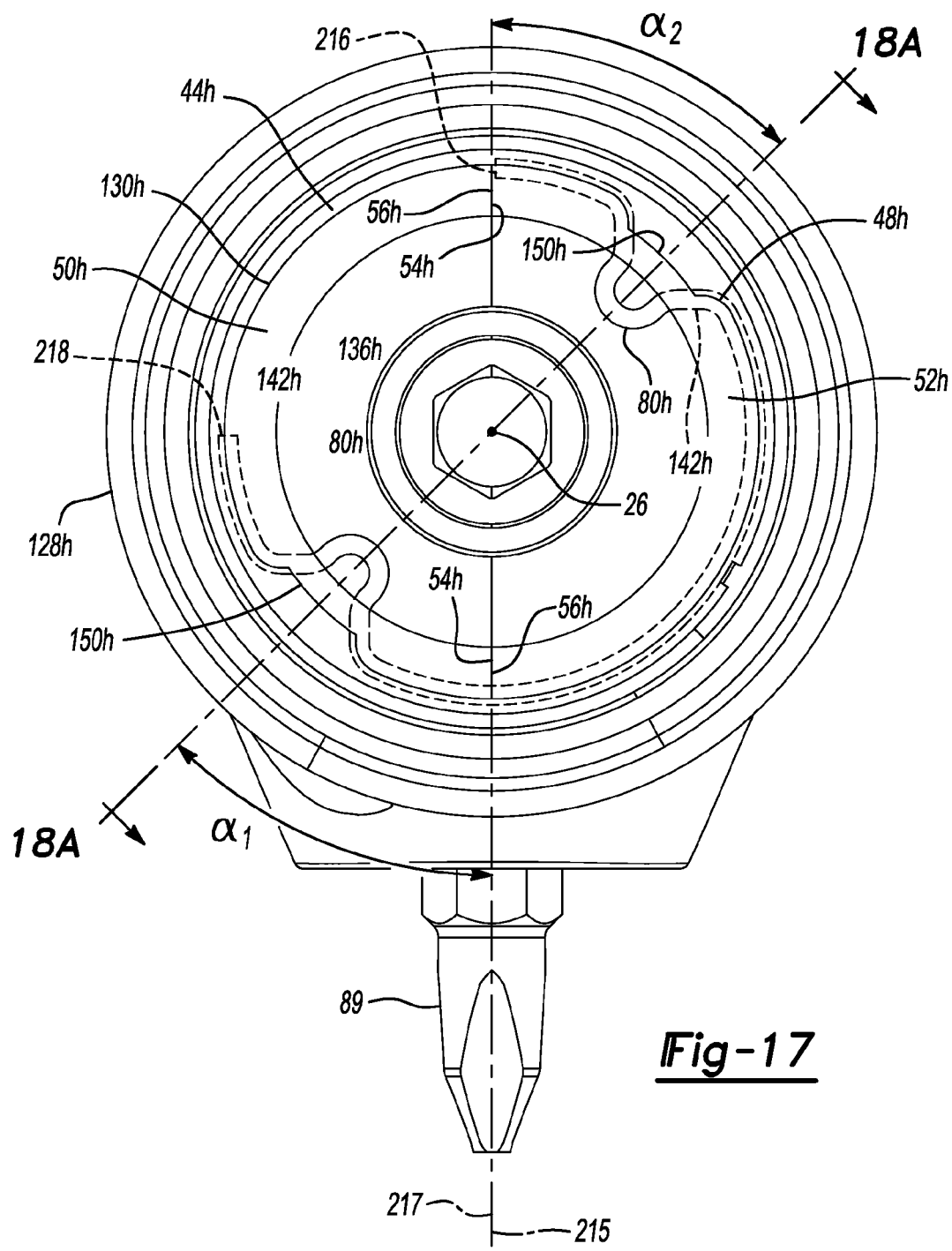
FIG. 17 is an end view of the power tool accessory of FIG. 16.

The aperture 142h may extend through the first and third channels 150h, 210. In this regard, the aperture 142h may be located where the first channel 150h intersects the third channel 210. The aperture 142h of the first clamshell 50h may be offset from the second mating surface 56h of the first clamshell 50h by a first angle $\alpha 1$. The aperture 142h of the second clamshell 52h may be offset from the second mating surface 56h of the second clamshell 52h by a second angle $\alpha 2$. The first angle $\alpha 1$ may be substantially equal to the second angle $\alpha 2$. Accordingly, as illustrated in FIG. 17, in an assembled configuration, the aperture 142h of the first clamshell 50h may be substantially aligned (i.e., in a plane) with the aperture 142h in the second clamshell 52h. In some configurations, the first and second angles $\alpha 1$, $\alpha 2$ may each be substantially equal to forty-five degrees. In this regard, the tool 89 may include an axis of rotation 215. The axis of rotation 215 and the axis 26 may define a plane 217. In the assembled configuration, the first and second mating surfaces 54h, 56h may be substantially aligned with, or otherwise disposed in, the plane 217, such that the aperture 142h of the first clamshell 50h is offset from the plane 217 and the axis of rotation 215 by the first angle $\alpha 1$ in a clockwise direction, and the aperture 142h of the second clamshell 52h is offset from the plane 217 and the axis of rotation 215 by one hundred eighty degrees, less the second angle $\alpha 2$, in a counterclockwise direction.

The retainer 48h may include a substantially U- or C-shaped construct, extending from a first end 216 to a second end 218. The retainer 48h may include a key feature 80h. As illustrated, in some configurations, the retainer 48h may include two key features 80h. In some configurations, the key feature 80h may be monolithically formed with the retainer 48h from a singular piece of material. In this regard, the retainer 48h may be formed from spring steel, or other suitably flexible material, and the key feature 80h may define a substantially U-shaped, radially inwardly projecting portion of the retainer 48h. In as assembled configuration, the retainer 48h may be disposed within the third channel 210 such that the key feature 80h is aligned with, and extends into, the aperture 142h. In this regard, in the assembled configuration, a first of the key features 80h may be offset from the plane 217 and from the axis of rotation 215 by the first angle a1 in the clockwise direction, and a second of the key features 80h may be offset from the plane 217 and from the axis of rotation 215 by one hundred eighty degrees, less the second angle $\alpha 2$, in the counterclockwise direction.

Figure 18A:
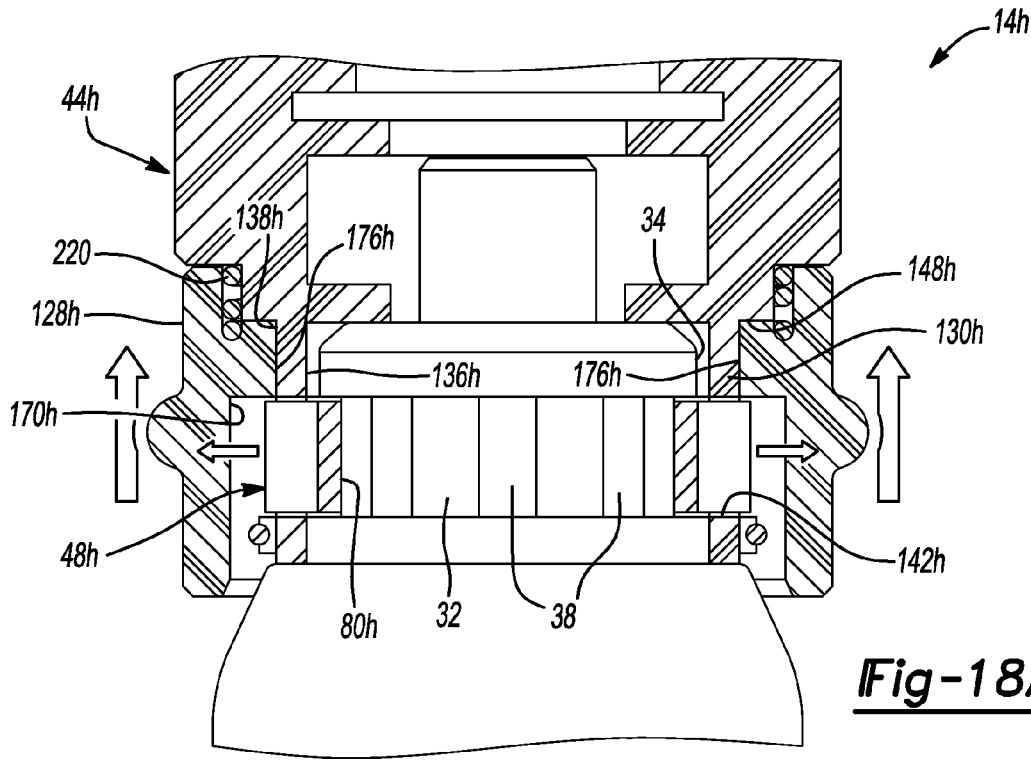
FIG. 18A is a cross-sectional view of the power tool accessory of FIG. 16 in a first position.
Figure 18B:
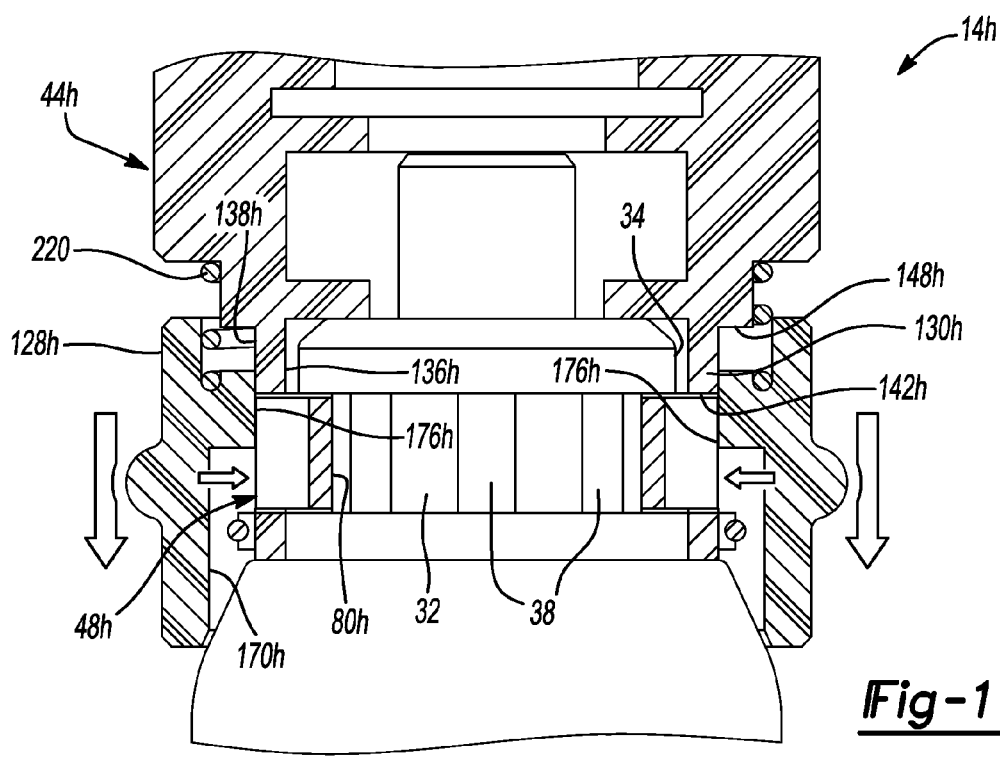
FIG. 18B is a cross-sectional view of the power tool accessory of FIG. 16 in a second position.

The collar 128h may include a radially inwardly projecting lock portion 176h. In this regard, the lock portion 176h may project radially inwardly from the inner surface 170h of the collar 128h. As illustrated in FIGS. 18A and 18B, in some configurations, the collar 128h may include two lock portions 176h. With reference to FIG. 16, the lock portion 176h may include opposed lock surfaces 184h. The lock surface 184h may taper radially inwardly. In this regard, the lock surface 184h may be concave or otherwise include a cylindrical profile, such that the profile of the lock surface 184h mirrors a profile of the key feature 80h.

In an assembled configuration, the collar 128h may be coupled to the hub portion 130h of the first and second clamshells 50h, 52h. In this regard, the collar 128h may be slidably disposed about the hub portion 130h, such that the lock portion 176h is received in the first channel 150h, and the retainer 48h is secured between the inner surface 170h of the collar 128h and the outer surface 138h of the hub portion 130h.

In operation, the accessory 14h can be assembled to the power tool 12 by aligning the apertures 142h, and thus the key feature 80h with the corresponding recess 42 of the power tool 12, and pushing or otherwise moving the accessory 14h along the axis 26 relative to the power tool 12 until the key feature 80h is aligned with the neck portion 32 of the power tool 12. To secure the accessory 14h to the power tool 12, the user can rotate the accessory 14h about the axis 26, such that key feature 80h is offset from the recess 42 about the axis 26. In this regard, the user can rotate the accessory 14h until the key feature 80h is aligned with one of the indexing features 38, such that the user can change the position of the tool subassembly 46 relative to the power tool 12 by selecting a desired indexing feature 38, or combination of indexing features, to receive the key feature 80h. As the user rotates the accessory 14h, the retainer 48h may bias or otherwise bend radially outwardly, such that the key feature 80h moves radially outwardly. In this regard, when the key feature 80h is offset from the indexing feature 38, the key feature may be substantially flush with the inner surface 136h of the hub portion 130h, such that the key feature 80h does not extend radially inwardly beyond the inner surface 136h.

With the collar 128h in a first or unlocked position (FIG. 18A), the lock portion 176h may be axially offset from key feature 80h. In this regard, the lock portion 176h may be disposed between the key feature 80h and the fifth stop surface 148h of the hub portion 130h along the axis 26. To lock the accessory 14h relative to the power tool 12, and thereby prevent the accessory from rotating about the axis 26, the user can move the collar 128h along the axis 26 into a second or locked position (FIG. 18B). In this regard, as illustrated in FIGS. 16, 18A and 18B, the accessory 14h may include a biasing member 220, such a compression spring or detent (not shown), for example. The biasing member 220 can urge or otherwise move the collar 128h along the axis 26 and into the locked position when the user releases the collar. The contact between the key feature 80h and the indexing feature 38 provides the user with tactile and/or audible feedback, which indicates that the attachment is in an orientation that the collar 128h can be moved into the locked position.

In the locked position, the lock portion 176h may apply a radially inward force on the key feature 80h, thus securing the key feature 80h within the aperture 142h and into engagement with the indexing feature 38. As will be appreciated, the user can overcome the force of the biasing member 220 to move the collar 128h back into the unlocked position, thus allowing the user to rotate the accessory 14h relative to the power tool 12 and/or remove the accessory 14h from the power tool 12.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A power tool comprising:
a motor;
an output shaft driven by the motor;
a neck portion configured to receive a removable attachment accessory; and
a collar portion supported by the neck portion;
wherein the neck portion defines a first diameter and includes a plurality of indexing features;
wherein the collar portion has an outer circumferential surface defining a second diameter that is greater than the first diameter;
wherein the outer circumferential surface has at least one recess;
wherein the collar has at least two recesses;
wherein the at least two recesses are disposed on opposite sides of the collar; and
wherein the plurality of indexing features comprises a plurality of recesses separated by peripheral surface portions.

2. The power tool of claim 1, wherein the at least one recess is aligned with one of the plurality of indexing features.

3. The power tool of claim 1, further comprising a removable attachment accessory, wherein the removable attachment accessory includes a retainer having a radially inwardly extending key feature and the plurality of indexing features are configured to selectively engage the key feature.

4. A power tool comprising:
a motor;
an output shaft driven by the motor;
a neck portion configured to receive a removable attachment accessory; and
a collar portion supported by the neck portion;
wherein the neck portion defines a first diameter and includes a plurality of indexing features;
wherein the collar portion has an outer circumferential surface defining a second diameter that is greater than the first diameter; and
wherein the outer circumferential surface has at least one recess;
further comprising a removable attachment accessory, wherein the removable attachment accessory includes a retainer having a radially inwardly extending key feature and the plurality of indexing features are configured to selectively engage the key feature;
wherein the recess is configured to allow the key feature to be moved past the collar.

5. The power tool of claim 1, wherein the power tool is a drill or a screwdriver.

6. A power tool accessory comprising:
a housing defining an inner chamber, the housing configured for removably coupling the accessory to a power tool; and a retainer at least partially disposed within the inner chamber, the retainer having an inwardly projecting key feature configured to engage the power tool;

wherein the accessory includes a hub and a collar slidably supported by the hub.

7. The power tool accessory of claim 6, wherein the retainer is resiliently flexible.

8. The power tool accessory of claim 6, wherein the retainer is substantially U-shaped.

9. The power tool accessory of claim 8, wherein the key feature is substantially U-shaped.

10. The power tool accessory of claim 6, wherein the housing includes first and second clamshells, the first clamshell having first and second pockets, and the second clamshell having third and fourth pockets aligned with the first and second pockets, respectively, and wherein the retainer includes a first member at least partially disposed in the first and second pockets, and a second member at least partially disposed in the third and fourth pockets.

11. The power tool accessory of claim 6, wherein the collar includes a radially inwardly extending lock portion operable to lock the retainer in a first position.

12. A power tool assembly comprising:
a housing having a neck portion and a collar portion, the neck portion including a first outer surface defining a first diameter and having a plurality of indexing features formed therein, the collar portion including a second outer surface defining a second diameter greater than the first diameter;
a motor;
an output shaft supported by the housing and driven by the motor, the output shaft defining an axis of rotation; and
an accessory removably coupled to the output shaft, the accessory including a retainer, the retainer having a radially inwardly extending key feature disposed between the housing and the collar;
wherein the collar includes a recess through which the key feature may pass;
wherein the accessory includes a hub and a collar slidably supported by the hub; and
wherein the collar of the accessory includes a radially inwardly extending lock portion operable to lock the retainer in a first position.

* * * * *